(12) United States Patent
Posch et al.

(10) Patent No.: US 10,752,784 B2
(45) Date of Patent: Aug. 25, 2020

(54) BINDER FOR COATING PLASTICS SUBSTRATES WITHOUT CHEMICAL OR PHYSICAL PRETREATMENT

(71) Applicant: PPT IP AG, Schaan (LI)

(72) Inventors: Michael Posch, Diepoldsau (CH); Fabio Posch, Diepoldsau (CH)

(73) Assignee: PPT IP AG, Schaan (LI)

( * ) Notice: Subject to any disclaimer, the term of this patent is extended or adjusted under 35 U.S.C. 154(b) by 128 days.

(21) Appl. No.: 15/572,860

(22) PCT Filed: May 9, 2016

(86) PCT No.: PCT/EP2016/060310
§ 371 (c)(1),
(2) Date: Nov. 9, 2017

(87) PCT Pub. No.: WO2016/180768
PCT Pub. Date: Nov. 17, 2016

(65) Prior Publication Data
US 2018/0346733 A1    Dec. 6, 2018

(30) Foreign Application Priority Data

| May 9, 2015 | (DE) | 10 2015 005 783 |
| May 9, 2015 | (DE) | 10 2015 005 784 |
| May 11, 2015 | (DE) | 10 2015 107 289 |
| Jul. 13, 2015 | (DE) | 10 2015 111 283 |
| Sep. 23, 2015 | (EP) | 15186510 |

(51) Int. Cl.

| C09D 5/00 | (2006.01) |
| C09D 7/61 | (2018.01) |
| C09D 7/40 | (2018.01) |
| C09D 7/80 | (2018.01) |
| C08J 3/00 | (2006.01) |
| C08J 7/04 | (2020.01) |
| C09D 7/65 | (2018.01) |
| C09D 123/28 | (2006.01) |
| C09D 127/06 | (2006.01) |
| C09D 129/10 | (2006.01) |
| C08K 3/34 | (2006.01) |

(52) U.S. Cl.
CPC .............. *C09D 5/002* (2013.01); *C08J 3/005* (2013.01); *C08J 7/0427* (2020.01); *C09D 7/61* (2018.01); *C09D 7/65* (2018.01); *C09D 7/70* (2018.01); *C09D 7/80* (2018.01); *C09D 123/28* (2013.01); *C09D 127/06* (2013.01); *C09D 129/10* (2013.01); *C08J 2323/28* (2013.01); *C08J 2327/06* (2013.01); *C08J 2423/28* (2013.01); *C08J 2427/06* (2013.01); *C08J 2429/10* (2013.01); *C08J 2463/00* (2013.01); *C08K 3/346* (2013.01)

(58) Field of Classification Search
None
See application file for complete search history.

(56) References Cited

U.S. PATENT DOCUMENTS

| 2004/0118318 | A1* | 6/2004 | Bernard | A01N 35/10 106/18.32 |
| 2006/0225612 | A1* | 10/2006 | Lejeune | C09D 5/028 106/287.13 |
| 2012/0183787 | A1* | 7/2012 | Nagelsdiek | C09D 163/00 428/429 |
| 2013/0096235 | A1* | 4/2013 | Fritzen | B82Y 30/00 523/456 |

FOREIGN PATENT DOCUMENTS

| EP | 0226387 | * | 6/1987 |
| EP | 0226387 | A2 | 6/1987 |
| EP | 0324497 | * | 7/1989 |
| EP | 0324497 | A2 | 7/1989 |

OTHER PUBLICATIONS

International Search Report and Written Opinion for International Application No. PCT/EP2016/060310 dated Jul. 19, 2016.
International Preliminary Report on Patentability for International Application No. PCT/EP2016/060310 dated Apr. 20, 2017.

* cited by examiner

*Primary Examiner* — Nathan T Leong
(74) *Attorney, Agent, or Firm* — Wolf, Greenfield & Sacks, P.C.

(57) ABSTRACT

With the binder produced according to the invention, a number of coating products can be produced which adhere to plastics directly and without any chemical or physical pretreatment. Base coats, high-gloss lacquers, metallic lacquers, clear lacquers and effect lacquers can be produced which can be applied directly on plastics; this is an absolute novelty because pretreatment is no longer required. With the binder according to the invention it is also possible to formulate adhesives which guarantee very good bonding between plastics themselves and also paperboard packaging. The invention relates to the binder as well as base coats based on them, one-coat lacquers and adhesives.

7 Claims, No Drawings

BINDER FOR COATING PLASTICS SUBSTRATES WITHOUT CHEMICAL OR PHYSICAL PRETREATMENT

RELATED APPLICATIONS

The present application is a national stage filing under 35 U.S.C. § 371 of International Application No. PCT/EP2016/060310, filed May 9, 2016. Foreign priority benefits are claimed under 35 U.S.C. § 119(a)-(d) or 35 U.S.C. § 365(b) of European application number 15186510.2, filed Sep. 23, 2015, German application number 102015111283.3, filed Jul. 13, 2015, German application number 102015107289.0, filed May 11, 2015, German application number 102015005783.9, filed May 9, 2015, and German application number 102015005784.7, filed May 9, 2015. The entire contents of each of these applications is incorporated herein by reference.

The invention relates to a binder and a base coat for coating of plastic substrates, a unibody one-coat lacquer, a one-coat metallic lacquer, an adhesive and a plastic in which the binder has been incorporated. In addition the invention relates to methods for producing a binder or a base coat for coating of plastic substrates, a unibody one-coat lacquer, a metallic lacquer and an adhesive.

Using the binder according to the invention a number of coating products can be produced, which adhere to plastics directly and without any chemical or physical pretreatment. base coats, high-gloss lacquers, metallic lacquers, clear lacquers and effect lacquers that can be applied directly to plastics can be produced, which represents a novelty, since pretreatment is no longer required. With the binder according to the invention it is also possible to formulate adhesives which guarantee very good bonding between the plastics themselves and also paperboards.

Plastics are widely used in industry because of their positive properties and versatile applicability. For example in the automotive manufacturing sector, plastics are used for producing both interior and exterior vehicle parts and accessories. In this process it is advantageous for various reasons to provide plastics with a coat of lacquer. On one hand, by applying a coat of lacquer to a plastic the appearance of the plastic can be upgraded, for example, by adding color. In addition, the plastic can be coated to increase the weathering resistance and light fastness.

In industry today, plastic molded parts are being increasingly used together with metal parts and require a coat of lacquer. This is especially true of motor vehicle parts, which are increasingly made of plastics, such as bumper fascia, spoilers, rocker panels, wheel linings and side claddings or lining strips. Such molded parts are increasingly made of plastics containing polypropylene, so-called polypropylene blends, with a polypropylene content of more than 50 percent by weight (wt.-%), based on the plastic fraction. Such parts are currently coated in unibody colors and effect colors. However, coatings of this type are not without problems.

Lacquers for unibody colors and effect-contrast colors must be formulated such that they meet the following requirements: good adhesion of the top coat system (unibody top coat or effect base coat), directly on the plastic surface, specifically without chemical pretreatment, at a low modulus of elasticity of <900 and with chemical pretreatment, specifically for example flame treatment, corona and plasma pretreatment, in many polypropylene blends with a modulus of elasticity of <600.

Up to now it was not possible in the motor vehicle sector to work without preliminary base coating of the plastic part before top coating in the case of lacquers for polypropylene plastic parts in effect body colors, i.e., in lacquers containing effect pigments such as metal pigments or pigments based on mica flakes, and which must have color correspondence with the lacquers for coating automobile bodies, without base coating of the plastic part prior to top coat lacquering.

One important prerequisite for a high-quality coating is the adhesion to the background, i.e., to the substrate surface. It is generally known that precisely in the case of the coating or lacquering of plastics, especially of nonpolar plastics such as polypropylene (PP) in pure form or in modified form (for example by addition of ethylene-propylene-diene monomer copolymers (EPDM)), severe adhesion problems with the plastic background can occur. To achieve acceptable adhesion of the respective coating agent, such nonpolar plastics are usually subjected to pretreatment with a surface-activating chemical or physical pretreatment. The most frequently used methods are flame treatment, plasma treatment and corona discharge. It is also known that adhesion-promoting substances, especially chlorinated polyolefins, may be used to improve adhesion. The use of adhesion-promoting substances is accomplished for example with the aid of adhesion primers that contain the adhesion-promoting substances and are applied to the plastic substrate in a separate coating process. In the prior art, these adhesion primers are possible only without pigmentation and form a transparent, thin layer, which enables adhesion to the lacquer layer that will follow.

The direct addition of adhesion-promoting substances to the coating agent, with which the decorative and/or technically advantageous coating is to be produced, is problematic in the known prior art. Even in the case of surface-activating pretreatment, the adhesion of coating agents to plastic substrates is not always sufficient, so that coatings of lacquered plastic parts progressively flake off, for example due to the effects of weathering or mechanical stress. Therefore in the prior art, the use of adhesion-promoting substances very often leads to less than optimal adhesion properties. In addition, the use of adhesion-promoting substances, especially chlorinated polyolefins, is disadvantageous from the environmental viewpoint. When aqueous coating agents are used, as is becoming increasingly common for environmental reasons in plastic coating and other areas, the adhesion problems are further intensified, especially in the lacquering of nonpolar plastic substrates, because of the differences in polarity between the two media, the plastic substrate and the coating agent.

The goal of the present invention is that of furnishing a binder from which in particular a base coat, a base lacquer, a unibody one-coat lacquer, a metallic lacquer or other one-coat lacquers for coating plastic substrates or an adhesive that does not have the deficiencies of the prior art can be produced. The binder and base coats, lacquers or adhesives produced from them are said to exhibit excellent adhesion to the plastic background. In addition, the binder and the products produced from it are said to have high adhesion-promoting properties. "Adhesion-promoting properties" preferably means that after the coating of plastic substrates with the binder or the base coat produced from it, lacquers adhere especially stably to the plastic and thus make lacquering possible at low cost and with high quality. The defects in the prior art, for example the use of only unpigmented plastic base coat adhesion promoters, are to be eliminated by the invention.

An additional task of the invention is thus that of producing a binder for diverse coatings that no longer require adhesion promoters and have good adhesion to plastics even without conventional chemical or physical pretreatment methods. In addition, the base coats produced with the binder guarantee good overpaintability and adhesion to top coats. In this way the overall structure should adhere in stable form to the plastic without the pretreatments required according to the previous prior art, for example having to use unpigmented adhesion promoters or physical treatments. Thus a further task of the present invention is that of supplying a method for coating of plastic substrates using a binder, or a base coat, which makes it possible to provide plastic substrates with a coating or lacquer layer, which exhibits excellent adhesion to the respective plastic substrate that is thus surprisingly better than is possible in the prior art. In particular, the adhesion of the plastic coatings produced according to the method of the invention should be better than that of lacquer layers applied to plastic substrates using previously known method. Furthermore it should be possible to execute the method without laborious pretreatment of the plastic as is described in the prior art.

The goal is accomplished according to the invention with a binder according to claim 1. The dependent claims represent preferred embodiments for solving the problem.

The invention relates to a binder for coating of plastics that can be produced by a method comprising the following steps:
1) Producing a first intermediate product using a method comprising the following steps:
   1a) Mixing and dissolving 5-45 wt.-% of a chlorinated polyolefin mixture in 50-99 wt.-% of a first organic solvent
   1b) Heating the mixture from the previous step to a temperature between 65° C.-120° C. for at least 30 min
   1c) Introducing 0.05-5 wt.-% of a modified silane mixture to the mixture from the previous step at a mixing temperature of 65° C.-120° C.,
   wherein the wt.-% in 1a)-1c) is based on the total weight of the first intermediate product and the total of the wt.-% is less than or equal to 100
2) Further processing the first intermediate product to make the binder using a method comprising the following steps:
   2a) Mixing 5-40 wt.-% of a vinyl chloride-vinyl ether copolymer into 50-90 wt.-% of a second organic solvent
   2b) Introducing 10-80 wt.-% of the first intermediate product to the mixture from the previous step
   2c) Homogenizing the mixture from the previous step, wherein the wt.-% in 2a)-2c) is based on the total weight of the binder and the total of the wt.-% is less than or equal to 100.

A preferred binder that can be produced by such a method has a surprisingly high adhesion-promoting capacity for plastics. Therefore such a binder is a particularly suitable base substance for coating plastics. In particular, the binder is suitable for coating plastics without requiring application of the conventional chemical or physical pretreatment methods. Lacquers, paints or adhesives adhere to plastics coated using the binder according to the invention with high durability, preferably directly on the plastics, without requiring laborious pretreatment of plastics as in the known prior art.

The pronounced adhesion-promoting capacity of the binder can be at least partially attributed to a high degree of cross-linking of the binder. In addition, the binder has high polarizing activity toward plastic surfaces, adhering firmly to these and facilitating the adhesion of additional layers, for example of lacquers. Here it is particularly surprising that the binder according to the invention is also especially suitable for the coating of nonpolar and solvent-resistant plastics and has high adhesion capacity to these. The process steps mentioned are advantageously particularly suitable for first mixing the weight fraction of the chlorinated polyolefin mixture homogeneously in the first organic solvent. In particular the step of heating to a temperature between 65° C.-120° C. leads to an especially reactive chlorinated polyolefin mixture. As a result of the thermal activation energy, the reaction mixture is particularly suitable for binding with the modified silane mixture and producing the positive adhesion-promoting characteristics of the plastics described. As a result of the activation temperature, active molecular groups are formed in the chlorinated polyolefin mixture, which form with the silanes at the indicated temperature a particularly homogeneous complex, having radicals that are required for subsequent mixing with the vinyl chloride-vinyl ether copolymer, to enable an optimal reaction. This is an especially surprising effect that was recognized according to the invention. For example, increased evaporation of organic solvent takes place in this temperature range. Therefore heating the mixture to a temperature between 65° C. and 120° C. on an industrial scale requires higher technical effort and the use of special mixing elements and extractor devices. Therefore it is not obvious for the person skilled in the art when producing a binder to perform the process steps for mixing a chlorinated polyolefin mixture with a modified silane mixture at a temperature of 65° C.-120° C. Not only in regard to the components used, but especially in regard to the process steps for producing the binder at the temperatures mentioned the binder that can be produced according to the invention therefore represents a departure from the prior art. In the execution of the process steps it may be preferred for a ripening time of at least 12 hours, preferably at least 24 hours, after completion of the 65° C.-120° C. reaction phase for the first intermediate product to be maintained before this is further processed to make the binder in step 2c).

The invention preferably comprises a binder that can be produced by the procedure mentioned. In other words, the invention also preferably comprises binder that can be produced by different methods, but that have the same properties as the binder that can be produced by the method cited. In a particularly preferred embodiment the invention relates to the binder produced by the method cited.

In a preferred embodiment, for producing the first intermediate product, first 10-20 wt.-% of the chlorinated polyolefin mixture is dissolved in 80-90 wt.-% of the first organic solvent and mixed. In addition, the mixture produced is advantageously heated to a temperature of 65° C.-120° C., preferably 75° C.-110° C., for at least 30 min. Then particularly 0.1-0.5 wt.-% of the modified silane mixture is added to the heated mixture at a mixing temperature of 65° C.-120° C. The preferred parameter ranges mentioned lead to an especially elevated adhesion-promoting capacity on nonpolar plastic.

In addition, in a preferred embodiment the chlorinated polyolefin mixture is added stepwise to the first organic solvent under continuous stirring with a dissolver, wherein the dissolver has a preferred diameter of 220 mm to 350 mm, and the stirring speed of the dissolver is preferably 300-700 revolutions per minute, most preferably 500 revolutions per minute. A mixing procedure of this type is especially suitable for increasing the reactivity of the starting materials and obtaining a very well crosslinked binder.

In addition, in another preferred embodiment the introduction of the modified silane mixture under continuous stirring of the mixture in step 1b) in the method according to the invention takes place through a dissolver, wherein the dissolver has a preferred diameter of 220 mm to 350 mm, and the stirring speed of the dissolver is preferably 300-700 revolutions per minute, most preferably 500 revolutions per minute. These values are particularly suitable for obtaining a homogeneous mixture and increasing the surface activity of the binder on plastics.

In an additional preferred embodiment, with the binder according to the invention, which can be produced by the above method, in step 1 b) the heating of the mixture to a temperature of 65° C.-120° C. for 1 h to 12 h, preferably for 4 h to 6 h. These heating time spans allow a slow rise in the reactivity of the mixture and are therefore particularly suitable for obtaining a homogeneous and crosslinked binder for coating of plastics. A binder of this type has an especially high adhesion-promoting capacity due to a high polarization potential for plastics.

In an additional step of the method according to the invention, first 5-40% of a vinyl chloride-vinyl ether copolymer is dissolved in 50-90% of an organic solvent. The solvent used is especially preferably selected from the group of the aromatics; xylene is especially preferred. This method step can preferably be carried out at room temperature, for example in a temperature range of 20-25° C. The homogenization in step 2b) is preferably performed with the aid of a dissolver, wherein the dissolver disk has a preferred diameter of 220 mm to 350 mm and the stirring speed of the dissolver is preferably 300-700 revolutions per minute, especially preferably 500 revolutions per minute.

Then this mixture produced is mixed with the first intermediate product and homogenized. Preferably the homogenization is performed using a dissolver at a room temperature for example between 20° C.-25° C. The dissolver preferably has a diameter of 220 mm to 350 mm, wherein based on this size the preferred stirring speed of the dissolver is 300-700 revolutions per minute, especially preferably 500 revolutions per minute. Within the meaning of the invention, it is preferred that at least partial, and preferably uniform mixing of the chemical components, which can be achieved by mechanical steps, for example stirring, shaking, etc.

Thus the binder contains 10-80 wt.-% of the first intermediate product. The positive properties of the first intermediate product for adhesion on plastics are increased by introduction of the vinyl chloride-vinyl ether copolymer. Surprisingly the vinyl chloride-vinyl ether copolymer reacts especially advantageously with the components of the first intermediate product and thus creates a binder which exhibits an especially strong adhesion capacity with plastic surfaces. It was especially surprising that this leads to synergistic effects, as a result of which the binder reacts especially strongly and rapidly with plastic surfaces, especially also nonpolar plastic surfaces. In contrast to the prior art, no laborious physical or chemical pretreatment is necessary for the coating of plastics with the binder according to the invention. As is described above, this is especially attributable to the reaction in producing the first intermediate, in which a complex of radicals forms from active molecular groups of the chlorinated polyolefins together with the silanes. It was recognized according to the invention that because of these components of the first intermediate product, especially strong cross-linking with the vinyl chloride-vinyl ether copolymer can be achieved.

Thus with this binder, strong polarization of the plastic surface is achieved, which increases the wetting of the plastic and thus the adhesion to plastics coated with the binder. Therefore such a binder is particularly suitable as a base substance for coating of plastics. Lacquers, paints or adhesives adhere to plastics coated using products based on the binder according to the invention adhere with high durability, without requiring laborious pretreatment of the plastic as in the known prior art. The pronounced adhesion-promoting capacity of the binder as is described above can be attributed at least partially to a high degree of cross-linking of the binder. In addition, the binder has high polarizing activity toward plastic surfaces, so that it adheres lastingly to them and facilitates the adhesion of additional layers, for example of lacquers. The binding agent according to the invention is also in particular suitable for the coating of nonpolar and solvent-resistant plastics suitable and has a high adhesion capacity on these.

The person skilled in the art also recognizes that various sequences of steps are appropriate in the method for producing a binder according to the invention. Preferably in separate reaction batches a first intermediate product is to be prepared according to steps 1a) to 1c), a second intermediate product according to step 2a), and then the first and second intermediate product are to be mixed together in a step 2b). However, it may also be preferred for that the first intermediate product to be produced in a batch according to the steps 1a) to 1c) and then the components of the second intermediate product to be introduced to this first intermediate product.

In an additional preferred embodiment, therefore, the invention comprises a binder which can be produced by a method comprising the following steps:
  i) Mixing and dissolving 0.5-36 wt.-% of a chlorinated polyolefin mixture in 5-79 wt.-% of a first organic solvent
  ii) Heating the mixture from the previous step to a temperature between 65° C.-120° C. for at least 30 min
  iii) Introducing 0.005-4 wt.-% of a modified silane mixture to the mixture from the previous step at a mixing temperature of 65° C.-120° C.,
  iv) Introducing 5-40 wt.-% of a vinyl chloride-vinyl ether copolymer and 50-90 wt.-% of a second organic solvent to the mixture from the previous step
  v) Homogenizing the mixture from the previous step, wherein the wt.-% in i)-v) are based on the total weight of the binder and the total of the wt.-% is less than or equal to 100.

It is preferred for steps iv) and v) to be performed at room temperature between 20° C. and 25° C.

In an additional preferred embodiment of the invention the further processing if the first intermediate product takes place using a method comprising the following steps:
  2a) Mixing 20-30 wt.-% of the vinyl chloride-vinyl ether copolymer into 40-60 wt.-% of the second organic solvent
  2b) Introducing 10-30 wt.-% of the first intermediate product to the mixture from the previous step
  2c) Homogenizing the mixture from the previous step, wherein the wt.-% in steps 2a)-2c) is based on the total weight of the binder and the total of the wt.-% is less than or equal to 100.

A binder that can be produced with the above-named wt.-% is especially suitable for coating a plastic, since especially durable coating of plastics is possible using such an optionally further processed binder. In addition, the quality of the coating in terms of its durability, smoothness or visual appearance decreases very little or not at all even under demanding conditions.

Therefore in a particularly preferred embodiment the invention relates to a binder for coating of plastics which can be produced using a method comprising the following steps:
1) Producing a first intermediate product by a method comprising the following steps:
   1a) Mixing and dissolving 10-20 wt.-% of a chlorinated polyolefin mixture in 80-90 wt.-% of a first organic solvent
   1b) Heating the mixture from the previous step to a temperature between 65° C.-120° C. for at least 30 min
   1c) Introducing 0.1-0.5 wt.-% of a modified silane mixture to the mixture from the previous step at a mixing temperature of 65° C.-120° C., wherein the wt.-% in 1a)-1c) are based on the total weight of the first intermediate product and the total wt.-% is less than or equal to 100
2) Further processing the first intermediate product to make the binder by a method comprising the following steps:
   2a) Mixing 20-30 wt.-% of a vinyl chloride-vinyl ether copolymer in 40-60 wt.-% of a second organic solvent
   2b) Introducing 10-30 wt.-% of the first intermediate product to the mixture from the previous step
   2c) Homogenizing the mixture from the previous step, wherein the wt.-% in 2a)-2c) are based on the total weight of the binder and the total of the wt.-% is less than or equal to 100.

These parameter ranges lead to a binder with especially high molecular affinity for plastics, in particular polar plastics. In addition, the binder is especially stable and durable. Therefore such a binder can be stored even for prolonged periods, i.e., for at least 10 months, without its adhesion characteristics in regard to plastics being substantially reduced.

The person skilled in the art also recognizes that various step sequences of the manufacturing process are suitable for preferred embodiments of the binder which can be produced according to the invention. It is preferable, as stated above, in separate batches to produce a first intermediate product according to steps 1a) to 1c), to produce a second intermediate product according to step 2a) and then to mix the first and second intermediate products in a step 2b). However, it may also be preferred, for example, for the first intermediate product according to steps 1a) to 1c) to be produced and the components of the second intermediate product to be introduced to this first intermediate product.

In an additional preferred embodiment, therefore, the invention comprises a binder which can be produced by a method comprising the following steps:
   i) Mixing and dissolving 1-6 wt.-% of a chlorinated polyolefin mixture in 8-27 wt.-% of a first organic solvent
   ii) Heating the mixture from the previous step to a temperature between 65° C.-120° C. for at least 30 min
   iii) Introducing 0.01-0.15 wt.-% of a modified silane mixture to the mixture from the previous step at a mixing temperature of 65° C.-120° C.,
   iv) Introducing 20-30 wt.-% of a vinyl chloride-vinyl ether copolymer and 40-60 wt.-% of a second organic solvent to the mixture from the previous step
   v) Homogenizing the mixture from the previous step, wherein the wt.-% in i)-v) are based on the total weight of the binder and the total of the wt.-% is less than or equal to 100.

It is preferable for the steps iv) and v) to be performed at room temperature between 20° C. and 25° C.

A "chlorinated polyolefin mixture" is defined in particular as chemical compounds that contain at least 70 wt.-% and preferably at least 90 wt.-% of one or more chlorinated polyolefins, wherein the wt.-% are based on the chlorinated polyolefin mixture. A chlorinated polyolefin mixture thus preferably may comprise principally chlorinated polyolefins, but need consist exclusively of chlorinated polyolefins. In particular, according to the invention, a chlorinated polyolefin mixture may also comprise additional components, such as preferably resins, preferably selected from a group comprising amino resins, epoxy resins and bisphenol A-epichlorohydrin resins. In addition a chlorinated polyolefin mixture may also contain additional components; in particular, a chlorinated polyolefin mixture may also contain chloroform.

It is preferred for the chlorinated polyolefin mixture to have a chlorine content of between 10%-50%, preferably between 20% and 35% and especially preferably between 25% and 30%. The above-mentioned chlorine fractions enable the formation of a specially cross-linked binder and thus increase the reactivity of the binder with the plastic to be coated. In this way, especially good adhesion to plastics, in particular including nonpolar plastics can be achieved.

Preferred chlorinated polyolefin mixtures are chlorinated polyethylene resin, a chlorinated polypropylene resin, a maleic anhydride-modified chlorinated polyethylene resin, a urethane-modified chlorinated polypropylene resin, a chlorinated ethylene-propylene copolymer or a chlorinated ethylene-vinyl acetate copolymer, each having a chlorine content of preferably 10-30 wt.-%.

In preferred embodiments the chlorinated polyolefin mixture is a Hardlen®, preferably a Hardlen® 14-LWP, Hardlen® 13-LP, Hardlen® 13-LLP, Hardlen® 15-LP, Hardlen® 15-LLP, Hardlen® 16-LP, Hardlen® DX-526P, Hardlen® CY-9122P, Hardlen® CY-9124P, Hardlen® HM-21P, Hardlen® M-28P, Hardlen® F-2P, Hardlen® F-6P, Hardlen® CY-1132, Hardlen® EH-801 or Hardlen® EW-5303. Quite especially preferably, the chlorinated polyolefin mixture is a Hardlen® 14-LWP or a Hardlen® DX-530P.

The above-named Hardlen® types are trade names for especially preferred chlorinated polyolefin mixtures that have developed into descriptive terms. The characterization of the especially preferred chlorinated polyolefin mixtures by these trade names is unambiguous. More detailed characterization of the Hardlen® types than that using the commercially employed trade names is not possible or reasonable. The Hardlen® types refer to the chemical compounds manufactured by Toyobo and specified and publicized on the Toyobo data sheet in April 2015. As of April 2015 the technical data sheet could be downloaded at http://www.toyobo-global.com/seihin/hardlen/.

The term "chlorinated polyolefins" designates in particular chlorinated polymers of the general structure ($—CH_2—CR^1R^2)_n$, in which $R^1$ represents hydrogen and $R^2$ represents hydrogen, a straight-chain or branched saturated aliphatic or cycloaliphatic group or an unsaturated group such as the phenyl radical. Specific polyolefins of this type are polyethylene, polypropylene, polybutylene, polyisobutene, polyhexene, polyoctene, polydecene and polyoctadecene as well as polystyrene. Particularly preferred is chlorinated polypropylene. Chlorinated polyolefins are preferably obtained by chlorination of these polymers and/or polymerization of monomers already containing chlorine, e.g., vinyl chloride and vinylidene chloride.

A "modified silane mixture" is in particular a chemical compound containing at least 30 wt.-%, preferably at least 50 wt.-%, especially preferably at least 70 wt.-% and most especially preferably at least 90 wt.-% of one or more modified silanes, wherein the wt.-% is based on the modified silane mixture.

A "modified silane" is in particular a silane derivative and/or a modified silane compound. The person skilled in the art knows that alkanes and/or germanes are groups of substances chemically similar to silanes. In certain embodiments therefore a modified silane also relates to a modified alkane, an alkane derivative, a modified alkane compound, a modified germane, a germane derivative and/or a modified germane compound. In additional preferred embodiments a modified silane may be understood as an organofunctional silane. In addition, in certain embodiments a modified silane may be understood as a vinyl-functional silane. In a particularly preferred embodiment a modified silane is understood to be a modified epoxysilane. In an additional, especially preferred embodiment, a modified silane is understood to be a functional epoxysilane with the general structure $R^1{}_a R^2{}_b \, Si(OR^3)_{4-a-b}$, wherein $R^1$ is an epoxy-substituted alkyl or aralkyl group, wherein the alkyl contains 4-30 C atoms, R3 is an alkyl or alkoxy-substituted alkyl, aryl or aralkyl group with two to ten carbon atoms, R2 is an alkyl group or alkoxy group-substituted alkyl, aryl or aralkyl group with one to ten carbon atoms, a is 1 to 3 and b is 0 to 2, with the specification that a+b is equal to 1, 2 or 3. The groups $R^1$, $R^2$, and $R^3$ can be cyclic, branched or straight-chain. In a most especially preferred embodiment the as modified silane is β-(3,4-epoxycyclohexyl)ethyl triethoxysilane as well as additional variants of this chemical compound, as is described in U.S. Pat. No. 571,432. In most especially preferred embodiments the modified silane mixture is CoatOSil® 1770.

CoatOSil® 1770 is a trade name for an especially preferred modified silane mixture, which has developed into a descriptive term. The characterization of the especially preferred modified silane mixtures via the conventional trade name CoatOSil® 1770 is therefore possible and reasonable. CoatOSil® 1770 relates to chemical compounds produced by the Momentive company and specified and publicized on the technical data sheet from Momentive dated April 2015. In April 2015 the das technical data sheet could be downloaded at https://www.momentive.com/Products/home.aspx?id=20459.

The vinyl chloride-vinyl ether copolymer is preferably obtained by copolymerization of vinyl chloride (general formula $C_2H_3Cl$ with a molecular weight of 62.50 g/mol) with vinyl ether. The vinyl chloride-vinyl ether copolymer is therefore also preferably designated as vinyl chloride- and vinyl ether-based copolymers. Organic compounds of polyvinyl chloride and diisopropyl ether. A vinyl group preferably designates a reactive ethylene radical, in particular the group of atoms R—CH=$CH_2$. In the graphic below, the vinyl group is represented as a functional group in an arbitrary molecule (top), vinyl chloride (center) and styrene (bottom).

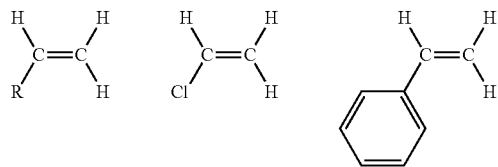

An especially preferred vinyl ether is isobutyl vinyl ether with the general formula $C_6H_{12}O$ and a molecular weight of 100.16 g/mol. Thus particularly preferred is a hydrolysis-resistant copolymer of vinyl chloride and isobutyl vinyl ether, which is suitable for use as a binder for printing inks, traffic marking paint, facade and anti-corrosion paints as well as for coatings on light metal, concrete and plastics. Therefore an especially preferred vinyl chloride-vinyl ether copolymer is a vinyl chloride-isobutyl vinyl ether copolymer. Particularly preferred vinyl chloride-isobutyl vinyl ether copolymers are the Laroflex® MP product group, preferably Laroflex® MP 15-45 and most especially preferably Laroflex® MP 35.

Laroflex® MP binders and Laroflex® MP 35 are trade names for especially preferred binders made of vinyl chloride and isobutyl vinyl ether-based copolymers (vinyl chloride-isobutyl vinyl ether copolymers), which have developed into a descriptive term. The characterization of the especially preferred binders made of vinyl chloride and isobutyl vinyl ether-based copolymers using these trade names is unambiguous. A more unambiguous characterization of the Laroflex® MP binders and Laroflex® MP 35 than that using the conventional trade name is not possible or reasonable. Laroflex® MP binders and Laroflex® MP 35 refer to the chemical compounds manufactured by the BASF company and specified and publicized on the BASF technical data sheet dated November 2010.

It is preferred that the vinyl chloride-vinyl ether copolymers, preferably the vinyl chloride-isobutyl vinyl ether copolymers, have a chlorine content of between 20%-60%, preferably between 30% and 50% and especially preferably between 40% and 48%. The above-named chlorine fractions allow especially high reactivity of the vinyl chloride-vinyl ether copolymer with mixtures of chlorinated polyolefins and modified silanes and thus result in a high adhesion capacity of the binder on plastics, in particular also nonpolar plastics.

Additional preferred vinyl chloride-isobutyl vinyl ether copolymers are HERRMANN 45 MP or Hostaflex VCM 6230 from Anhui Herrman Impex Co., Ltd.

The term adhesion-promoting capacity preferably means that after coating plastic substrates, without physical or chemical pretreatment, with the binder or der base coat, a subsequent coat of lacquer adheres especially stably on the plastic and thus makes it possible to achieve a lacquer coating at low cost and high quality. In this process, the adhesion-promoting capacity on plastics is not limited to bringing about especially good adhesion of lacquers on plastics, but instead can also serve for bringing about especially good adhesion of other substances, e.g., plastic adhesives or even plastics themselves, on plastics.

Plastics here preferably mean acrylic ester-styrene-acrylonitrile, acrylonitrile/-butadiene/acrylate, acrylonitrile-butadiene-styrene, acrylonitrile/chlorinated polyethylene/styrene, acrylonitrile/methyl methacrylate, butadiene rubber, butyl rubber, casein plastics, galalith, cellulose acetate, cellulose hydrate, cellulose nitrate, chloroprene rubber, chitin, chitosan, cyclo-olefin copolymers, epoxy resin, ethylene-ethyl acrylate copolymer, ethylene-propylene copolymer, ethylene-propylene-diene rubber, ethylene vinyl acetate, fluorinated rubber, liquid crystal polymers, urea-formaldehyde resin, high impact polystyrene, isoprene rubber, lignin, melamine-formaldehyde resin, melamine/phenol-formaldehyde, methyl acrylate/butadiene/styrene, natural rubber (*Gummi arabicum*), phenol-formaldehyde resin, perfluoroalkoxy alkane, polyacrylonitrile, polyamide, polybutylene succinate, polybutylene terephthalate, polycaprolactone, polycarbonate, polychlorotrifluoroethylene, polyester, polyester amide, polyether-block-amide, polyetherimide, polyether ketone, polyether sulfone, polyethylene, polyethylene terephthalate, polyhydroxyalkanoate, polyhydroxybutyrate, polyimide, polyisobutene, polylactide (polylactic acid), polymethacryl methylimide, polytrimethylene terephthalate, polymethylmethacrylate, polymethylpentene, polyoxymethylene or polyacetal, polyphenylene ether, polyphenylene sulfide, polyphthalamide, polypropylene, polypyrrole, polystyrene, foamed polystyrene, polysulfone, polytetrafluorethylene, polyurethane, polyvinyl acetate, polyvinyl butyral, polyvinyl chloride (hard PVC), polyvinyl chloride (soft PVC), polyvinylidene fluoride, polyvinylpyrrolidone, silicone rubber, styrene-acrylonitrile copolymer, styrene-butadiene rubber, styrene-butadiene-styrene, thermoplastic starches, thermoplastic polyurethane, unsaturated polyester, vinyl chloride/ethylene and vinyl chloride/ethylene/methacrylate.

Particularly preferably, plastics mean polypropylene (PP), ethylene-propylene-diene rubber (PP-EPDM), expanded polypropylene (EPP), glass fiber reinforced plastic (GFK), acrylonitrile-butadiene-styrene (ABS), polyamide (PA), PA 6, polybutylene terephthalate (PBT) and/or polyvinyl chloride (PVC).

In general, the term lacquers is applied to coating materials with protective and/or optical effects, produced, e.g., by colorizing; in particular, lacquers are 1-component lacquers, 2-component lacquers, one-coat lacquers, lakes, protective lacquers, alkyd resin lacquers, oil paints, oil-based lacquers, cellulose nitrate lacquers; pitch- and tar-containing lacquers, shellacs, phenolic lacquers, urea lacquers, melamine resin lacquers, polyester-based paints, epoxy resin lacquers, polyurethane resin lacquers, polystyrene lacquers, polyvinyl resin lacquers, paints or lacquers based on acrylic polymers, paints or lacquers based on synthetic polymers, industrial lacquers, powder lacquers, latex paints, synthetic resin bonded plasters, sizing paints, watercolors, silicate paints, silicate plasters, dispersion lacquer paints, electrophoresis lacquers, water-based lacquers, silicone resin paints; silicone resin plasters or paints based on synthetic or natural polymers.

In addition, especially preferably, organic solvents means aromatic solvents such as xylene, toluene or solvent naphtha or aromatics-containing solvents such as oil-based printing ink or white spirit.

Thus in a preferred embodiment the invention relates to a binder which can be produced with the method according to the invention, wherein the chlorinated polyolefin mixture comprises one or more chlorinated polyolefins and resins, preferably selected from a group comprising amino resins, epoxy resins and bisphenol A-epichlorohydrin resins.

In a particularly preferred embodiment, the invention relates to a binder which can be produced with the method according to the invention, wherein the chlorinated polyolefin mixture comprises a Hardlen®, preferably Hardlen® 14 LWP and/or a Hardlen® DX-530P.

In this case a Hardlen®, preferably a Hardlen® 13-LP, a Hardlen®13-LLP, a Hardlen®15-LP, a Hardlen® 15-LLP, a Hardlen® 16-LP, a Hardlen® DX-526P, a Hardlen® CY-9122P, a Hardlen® CY-9124P, a Hardlen® HM-21P, a Hardlen® M-28P, a Hardlen® F-2P, a Hardlen® F-6P, a Hardlen® CY-1132, a Hardlen® EH-801, a Hardlen® EW-5303, most especially preferably a Hardlen® 14-LWP and/or a Hardlen® DX-530P represents an especially suitable chlorinated polyolefin mixture for producing the binder, since these particularly suitably increase the adhesion-promoting capacity for nonpolar plastics. In addition, it was completely surprising that the Hardlen® types mentioned and most especially Hardlen® 14 LWP and/or Hardlen® DX-530P increase the durability of the binder. Thus the binders produced using the Hardlen® types mentioned and most especially using Hardlen® 14 LWP and/or Hardlen® DX-530P have a high adhesion-promoting capacity over an especially long period of more than 12 months.

In an additional preferred embodiment of the binder according to the invention, the first organic solvent is an aromatic hydrocarbon, preferably selected from the group comprising xylene, toluene and solvent naphtha. The solvents mentioned are particularly suitable for dissolving the chlorinated polyolefin mixture and the modified silane mixture, and thus providing a homogeneous binder with a high degree of cross-linking.

In a particularly preferred embodiment the binder according to the invention comprises a modified silane mixture which is preferably a modified epoxysilane, especially preferably a CoatOSil® 1770. The coating characteristics of the epoxysilane, in particular the CoatOSil® 1770, when mixed with the chlorinated polyolefin mixture, lead to surprising effects. In particular, the mixture increases the binding affinity for plastic substrates, so that a binder produced in this way has excellent adhesion characteristics on various plastic substrates.

In a preferred embodiment, the binder is characterized in that it is which can be produced by the above method, wherein in an additional step, 1-35 wt.-%, preferably 0.5-2 wt.-%, of an acrylate is added to the mixture of 2c), wherein the wt.-% is based on the total weight of the binder. Most especially preferably the acrylate is methacrylate resin, especially preferably Degalan® PM 381 N. Advantageously the further addition of the acrylates mentioned results in the fact that the binder adheres especially well to plastics and thus prepares them especially well for coating with, e.g., lacquers.

In an additional preferred embodiment the binder is characterized in that the second organic solvent comprises an aromatic hydrocarbon, preferably selected from the group comprising xylene, toluene and solvent naphtha. These are especially suitable for dissolving and mixing the polymer constituents, in particular the vinyl chloride and isobutyl vinyl ether-based copolymers.

Most especially preferably the second organic solvent consists of xylene. In addition, an especially high viscosity of the binder with at the same time a high degree of cross-linking is also obtained. The preferred embodiment is thus especially suitable for the coating of plastics.

In an additional embodiment the binder is characterized in that the second organic solvent comprises an ester, preferably selected from a group comprising butyl acetate, 1-methoxypropyl acetate, methyl or ethyl glycol acetate, butyl glycol acetate and ethyl diglycol acetate. These particularly increase the homogeneity and reactivity of the binder.

Furthermore, in an additional embodiment the organic solvent can consist of 20-60 wt.-% butyl acetate and 40-80 wt.-% xylene, wherein the total of the wt.-% of the butyl acetate and the xylene makes 100.

In a preferred embodiment the binder is characterized in that the vinyl chloride-vinyl ether copolymer is a vinyl chloride-isobutyl vinyl ether copolymer, i.e., comprises copolymers based on vinyl chloride ($C_2H_3Cl$) and isobutyl vinyl ether ($C_6H_{12}O$). Particularly preferred vinyl chloride-isobutyl vinyl ether copolymers are Laroflex® MP (MFO—CH2-CH(CH3)2-(CH2-CH)m-(CH2-CHCL)n— main raw material Cinylchloride 75%; vinyl isobutyl ether 25%) binders, preferably Laroflex® MP 35. The Laroflex® MP binder, in particular Laroflex® MP 35, especially increases the polarizing ability of the binder in regard to plastic surfaces. In addition, the Laroflex® MP binder, especially Laroflex® MP 35, results in particularly stable cross-linking of the binder according to the invention and raises its adhesion-promoting capacity.

In an additional embodiment the invention relates to a method for producing a binder comprising the following steps:
1) Producing a first intermediate product by a method comprising the following steps:
   1a) Mixing and dissolving 5-45 wt.-% of a chlorinated polyolefin mixture in 50-99 wt.-% of a first organic solvent
   1b) Heating the mixture from the previous step to a temperature between 65°–120° C. for at least 30 min
   1c) Introducing 0.05-5 wt.-% of a modified silane mixture to the mixture from the previous step at a mixing temperature of 65° C.-120° C.,
   wherein the wt.-% in 1a)-1c) is based on the total weight of the first intermediate product and the total of the wt.-% is less than or equal to 100
2) Further processing the first intermediate product to make the binder by a method comprising the following steps:
   2a) Mixing 5-40 wt.-% of a vinyl chloride-vinyl ether copolymer in 50-90 wt.-% of a second organic solvent
   2b) Introducing 10-80 wt.-% of the first intermediate product to the mixture from the previous step
   2c) Homogenizing the mixture from the previous step, wherein the wt.-% in 2a)-2c) is based on the total weight of the binder and the total of the wt.-% is less than or equal to 100.

The person skilled in the art recognizes that preferred embodiments that were disclosed for the binder according to the invention are likewise preferred for the method according to the invention. In addition, advantages disclosed for the binder according to the invention and preferred embodiments thereof are likewise applicable for the method according to the invention and for a binder produced by the method according to the invention. Thus the invention likewise relates to a binder produced by the method according to the invention and preferred embodiments thereof.

The binder according to the invention has a high adhesion-promoting capacity on plastics. Here the adhesion-promoting capacity is not limited merely to producing especially good adhesion of a total lacquer buildup on plastics, but the achievement of especially good adhesion of other substances, e.g., plastic adhesives or even plastics themselves, on plastics is also possible.

In addition the binder according to the invention, because of a high adhesion-promoting capacity, is particularly suitable for producing a base coat for lacquer coating of plastics.

The invention thus furthermore relates to a base coat for coating of plastics, which can be produced by a method comprising the steps of
   3a) Mixing 10-30 wt.-% of the binder with 2-10 wt.-% of a bentonite mixture
   3b) Adding 10-30 wt.-% of a pigment mixture to the mixture from the previous step
   3c) Adding 0.1-5 wt.-% of an additive mixture to the mixture from the previous step
   3d) Adding 10-50 wt.-% of a third organic solvent to the mixture from the previous step,
   wherein the wt.-% in steps 3a)-3d) are based on the total weight of the base coat and the total of the wt.-% is less than or equal to 100.

For producing the primer, in step 3a) 2-10 wt.-% of a bentonite mixture is introduced to the binder according to the invention or preferred embodiments thereof. The bentonite mixture preferably comprises 60-90 wt.-% of an organic solvent and 1-20% wt.-% bentonite selected from the group of bentonite 34, bentonite 38 or a combination thereof. The bentonite mixture, in particular the preferred embodiment mentioned, increase the stability of the base coat in particular. In addition, the bentonite mixture and the preferred embodiments increase the physical durability of the base coat on plastics and thus lead to an additional protective function.

In the case of lacquering plastic parts with automotive lacquers in the prior art before the base coat was used, a nonpigmented adhesion promoter was necessary to form a bonding course. In the known prior art the base coat on plastic parts does not bring about adhesion buildup, but rather the base coats serve to smooth out irregularities in the background to be coated. In the known prior art the following working steps were required
   i) Physical or chemical pretreatment
   ii) Cleaning the plastic substrate
   ii) Spraying on a colorless adhesion promoter,
   ii) Applying the base coat,
   iv) Intermediate grinding,
   v) Application of a top coat Using the base coat, physical or chemical pretreatment and an adhesion promoter can advantageously be dispensed with. Therefore a lacquer layer can be applied to a plastic in an especially simplified manner. Advantageously, only the following steps are needed for this purpose:
   i) Cleaning the plastic substrate
   ii) Applying the base coat directly on the plastic,
   iii) Applying the top coat.

Advantageously, physical or chemical pretreatment or the use of a separate adhesion promoter is not necessary with a base coat according to the invention. This is a particular advantage of the of the base coat according to the invention compared with means and methods of the prior art.

Here, the mixing of the binder according to the invention with the bentonite mixture is preferably performed with the aid of a rotary dissolver, but can also take place with other mechanical mixing devices. Then 10-30 wt.-% of a pigment mixture is introduced to the mixture formed in step 3a). The pigment mixture preferably comprises chemical compounds selected from the group comprising black paste, titanium dioxide, Calpex or combinations thereof. The basic color of the base coat is determined by the selection of the pigment mixture. In addition the preferred pigment mixtures give the base coat especially good coverage. The pigment mixture can also contain additional fillers which have a positive effect on the physical drying capacity of the base coat.

In an additional step, 0.1-5 wt.-% of an additive mixture is added to the mixture of step 3b). The additive mixture preferably comprises epoxy resins or bisphenol A-epichlorohydrin resins, preferably an Epikote™ and most especially preferably an Epikote™ 828. The epoxy resins, in particular the Epikote™ 828 mentioned, result in improved physical-mechanical properties of the base coat. For example, the base coat is made softer and more workable by addition of the epoxy resin mixture, in particular of an Epikote™. Other preferred additives are fumed silica, especially preferably Aerosil® or BYK 80, BYK 355 or BYK 415. These additives allow improved processing of the base coat.

The above-named Epikote™, Aerosil® and BYK types are trade names for especially preferred additives, which have developed into a descriptive term. The characterization of the especially preferred additives by these trade names is unambiguous. A more specific characterization of the additives than via the conventional trade name is not possible or reasonable. The Epikotes™ refer to the chemical compounds as manufactured by Momentive™ and specified and publicized on data sheets in April 2015 and at www.momentive.com. Aerosil® relates to the chemical compounds manufactured by the Aerosil® company, which were specified and publicized on data sheets in April 2015 at www.aerosil.com. The BYK types refer to the chemical compounds as manufactured by BYK and specified and published on data sheets in April 2015 and at www.byk.com.

In an additional step for producing the base coat according to the invention, addition of 10-50 wt.-% of a third organic solvent to the mixture of step 3c) is performed. The third organic solvent in this case preferably comprises an aromatic hydrocarbon, preferably selected from the group comprising xylene, toluene and solvent naphtha. In addition the third organic solvent preferably comprises an ester, preferably selected from a group comprising butyl acetate, 1-methoxypropyl acetate, methyl or ethyl glycol acetate, butyl glycol acetate and ethyl diglycol acetate. Most especially preferably the third organic solvent consists of 40-70 wt.-% butyl acetate and 30-60 wt.-% xylene, wherein the total of the wt.-% of the butyl acetate and the xylene makes 100. In addition, an especially high viscosity of the binder with a similarly high degree of cross-linking is obtained with this composition. Particularly preferably, by mixing in the third solvent, the density of the base coat is adjusted to 0.8-1.2 g/cm$^3$, most especially preferably to 1.30 g/cm$^3$. With this density and viscosity the die base coat gets an especially high stability and prolonged stability, so that the base coat can be used for coating plastics without a loss of quality even after more than 12 months.

A pigment mixture preferably designates mixtures that contain pigments or fillers.

Pigments are preferably chemical compounds that serve to provide coloration. Preferred pigments are pigments for violet coloration, in particular Chinese purple, dioxazine violet, cobalt violet, magenta lake, magenta violet, ultramarine violet; pigments for imparting a blue color, in particular, Egyptian blue, azurite, Prussian blue, indanthrone, indigo, lime blue, cobalt blue, cobalt blue-coelin blue, manganese blue, Maya blue, phthalocyanine blue pigments, reflex blue, smalt, ultramarine blue, vivianite, Wallerfangen blue, zircon-coelin blue; pigments for turquoise coloration: in particular cobalt turquoise, phthalocyanine turquoise; pigments for green coloration: cadmium green, chrome fast green, chrome green, chromium oxide green, terra verde, verdigris, cobalt green, copper resinate, malachite green, permanent green, phthalocyanine green, Rinman green, Paris green, Veronese green, cinnabar green; pigments for yellow coloration: in particular orpiment, barium chromate, benzimidazolone, bismuth vanadate, lead-tin yellow, brilliant yellow, cadmium yellow, chrome yellow, chromium antimony titanate, earth colors: yellow earth, yellow ocher, Sienna earth, jarosite, iron oxide yellow, flavanthrone, Hansa yellow, Indian yellow, indolinone, Cassel yellow, massicot, Naples yellow, nickel dioxine yellow, nickel antimony titanate, praseodymium yellow, Schel lacquer, Schütt yellow, pigments for orange coloration; in particular lead chromate/molybdate, chrome orange, cadmium orange, cerium sulfide, molybdate orange, perinone; pigments for red coloration: in particular quinacridone, chrome red, dibromanthanthrone, diketopyrrolopyrrole, dragon's blood, red earths, red bole, red ochre, Persian red, Spanish red, Falun red, burnt ocher, burnt Sienna, iron oxide red, Mars red, Pompeian red, Venetian red, caput mortuum, Terra Pozzuoli, cadmium red, carmine red, Kermes lacquer, Krapp lacquer, synthetically from alizarin, lycopene, minium, flame red, molybdate red, Paris red, PTCDA, realgar, redwood lacquer, rubrica, cinnabar red; pigments for brown coloration; in particular, asphalt, bister, brown ocher, Sienna, Cassler brown, manganese brown, mumia, Prussian brown, sepia, umber, burnt umber; pigments for white coloration: in particular barium sulfate, white lead, calcium carbonate, chalk, whiting, ground marble, cristobalite, kaolin, Kremser white, lithopone, selenite, satin white, titanium dioxide, clay, zinc oxide, zinc sulfide and pigments for black coloring: in particular aniline black, bone black, graphite, charcoal, peach-stone black, copper dichromate, iron oxide black, vine black, carbon black, spinel black or black paste.

Fillers are preferably defined as insoluble additives that impart special mechanical properties to the base coat, the lacquer or the plastic and in particular facilitate processing. Preferred fillers are ground plastics, ground elastomers, sodium sulfate, glass fibers, silicates, carbonates, chalk, sulfates, gypsum, silicates, glass beads, cullet, silica, carbon black, oxides, metal oxides, titanium dioxide, barium sulfate, aluminum hydroxide, calcium carbonate, talcum and/or carbon fibers.

In addition the invention relates to a base coat for coating plastics comprising C1) 10-30 wt.-% of the binder
C2) 2-10 wt.-% of the bentonite mixture
C3) 0.1-30 wt.-% of the pigment mixture
C4) 0.1-5 wt.-% of the additive mixture
C5) 10-50 wt.-% of the third organic solvent.

The advantageous properties of the preferred embodiments of the binder, the bentonite mixture, the pigment mixture, the additive mixture and the third organic solvent, the base coat and preferred embodiments thereof apply analogously. In particular, the composition of the base coat thus contains 10-30 wt.-% of the binder according to the invention or preferred embodiments thereof. As a result of the described advantageous adhesion promotion of the binder to plastics, the base coat is particularly suitable for coating plastics.

The base coat according to the invention is especially suitable for coating plastics. The adhesion-promoting properties of the binder according to the invention allow for the coating of plastics with the aid of the base coat, without pretreatment of the plastic surfaces. Conventionally, for coating plastics, first a laborious chemical or physical pretreatment of the surface is performed so that the base coat or a later coat of lacquer or coloring product will adhere to the plastic. Conventional pretreatment methods of this type comprise the use of primers, stoving and grinding, particularly in the automotive-sector, but also flame treatment, fluorination or plasma treatment. With the base coat according to the invention, surprisingly these steps are now completely unnecessary. This means great savings of time, energy and production costs. In addition, it was surprising, that greater adhesion promotion is achieved by coating with the base coat according to the invention than was possible with conventional base coats, even with laborious pretreatment of the plastics.

After applying the base coat to a plastic, it is advantageously possible to cover the plastic directly, preferably with a solvent-containing, pigmented lacquering layer. In particular in this way, with only a single application of the base coat on a plastic, a 1-component or a 2-component lacquer can be applied directly to the plastic treated with the base coat. The special adhesion promotion of the base coat for the lacquer layers is specifically attributable to the chemical and physical properties of the binder according to the invention. The molecular components of the binder according to the invention react with the surface of the plastic and consequently induce polarization, which makes the subsequent coating with a lacquer especially long-lasting. The binder according to the invention also enhances the adhesion-promoting properties.

A preferred embodiment of the method for coating a plastic using the base coat according to the invention comprises the following steps:

4a) Cleaning the plastic surface

4b) Diluting the base coat by mixing in an organic solvent, so that in the viscosity measurement with a 4 mm cup according to DIN 53211, outflow times of 5-40 s are achieved, 4c) Applying a 5-50 µm thick layer of the diluted base coat to the plastic, preferably using a compressed-air operated lacquering device Here, step 4a) replaces the conventionally necessary pretreatment of the plastic surface. The plastic surface can be cleaned using conventional plastic cleaners. It is known to the person skilled in the art that if a plastic free from soil is present, cleaning is not necessary. In step 4b) dilution of the base coat by mixing in an organic solvent is performed, so that outflow times of 5-40 s are achieved in the viscosity measurement with a 4 mm cup according to DIN 53211. If the base coat already has the viscosity characteristics mentioned, the person skilled in the art knows that no additional dilution with an organic solvent is necessary. Preferably, however, the base coat according to the invention has not yet been adjusted to the viscosity mentioned, since the base coat with lower viscosity according to the invention exhibits markedly increased stability of its adhesion-promoting properties. Adjusting to a viscosity corresponding to step 4b) therefore preferably takes place shortly before the coating of the plastic with a base coat. The base coat according to the invention with a viscosity corresponding to the requirements in step 4b) can be applied to the plastic using an air pressure-driven painting device. In this case the viscosity parameters mentioned are especially advantageous to allow for a homogeneous layer. In particular, in this way a homogeneous layer thickness of 5 µm to 50 µm can be established. This layer thickness of the base coat is especially advantageous for the later application of lacquer layers. Thus after coating with the base coat, a 1-component or 2-component lacquer can advantageously be applied directly.

Thus the base coat according to the invention replaces conventional adhesion promoters and a priming filler/filler. Through application of the base coat according to the invention to a plastic, polarization of the surface takes place. Consequently the coating can permanently bond to the substrate on the molecular level. In addition, such a coating of plastics with the base coat according to the invention does not require any special aftertreatment. The coating can be overpainted with lacquer layers for up to 48 hours after application of the base coat without any intermediate grinding at all. The base coat is already able to be overpainted wet-on-wet after less than 1 h, preferably less than 30 min, in particular 15 min of flash-off time. However, it can also be processed after several days of storage without roughening again. The processing characteristics of the base coat according to the invention allow perfect adaptation to the following process steps such as a later coat of lacquer.

In a preferred embodiment, the invention also relates to the use of the binder according to the invention for producing a one-coat lacquer, a clear lacquer, a metallic lacquer or an adhesive.

Preferably further building on the binder, a pigment can already be introduced directly when producing a base coat. In this way the coating process for plastic can be optimized advantageously yet again. Through the addition of a lacquer, therefore, a base lacquer can be produced directly building on the binder. This base lacquer can advantageously be applied directly to a plastic. As a result, it is not necessary for first a base coat and in a second step, a coat of lacquer to be applied in the process steps. This also reduces the time expenditure and the processing costs.

In the lacquering, in addition to the usual color pigments, effect pigments may also be added to the base lacquer. For, example metallic pigments or effect pigments based on mica flakes or sericite powders may be used as effect pigments in the base lacquers according to the invention, for example, such as those customarily used in the area of motor vehicle lacquering.

The base lacquer according to the invention is particularly suitable for coating plastic motor vehicle parts. The use of the base lacquer according to the invention offers the benefit of good adhesion of the lacquer directly on the plastic substrates. No pre-lacquering or base coating of the plastic substrate, as was indispensable in the prior art, is necessary. The application of the base lacquer can take place without pretreatment, but also after pretreatment of the plastic (e.g., flame treatment, corona or plasma treatment). An additional benefit of the base lacquer according to the invention is the possibility for extensive coordination of the effect colors with that of the lacquer coatings on metal parts which are to be used together with the lacquered plastic parts, for example in motor vehicle production.

The binder according to the invention and the base coat which can be produced using the binder according to the invention are especially suitable for coating plastics. Plastics that can be coated according to the invention preferably include polypropylene (PP), ethylene-propylene-diene rubber (PP-EPDM), expanded polypropylene (EPP), glass fiber reinforced plastic (GFK), acrylonitrile-butadiene-styrene (ABS), polyamide (PA), PA 6, polybutylene terephthalate (PBT) and polyvinyl chloride (PVC). It was completely surprising, that such a large number of plastics can be coated according to the invention. In particular, it was completely surprising that nonpolar and solvent-resistant plastics according to the invention can be coated. The coating using the binder or the base coat according to the invention is surprisingly durable on all these plastics and imparts optimal adhesion characteristics for later process steps, e.g., lacquering.

In addition, the invention relates to a plastic with enhanced adhesion-promoting capacity, which can be produced by admixture of the binder according to the invention or preferred embodiments thereof. The enhanced adhesion-promoting capacity is preferably an enhanced binding and/or adhesion capacity, especially preferably an enhanced binding and/or adhesion capacity to the plastic for lacquers preferably selected from the group of base lacquers, one-coat lacquers, colored lacquers and protective lacquers, wherein these may be transparent or non-transparent. Here, the binder according to the invention is preferably mixed into the plastic during its manufacturing. The manufacturing step of the plastic in which the admixture of the binder can take place is known to the person skilled in the art. The binder according to the invention can serve directly as a starting material for producing the plastic. Preferred plastics produced by mixing in the binder according to the invention are polypropylene (PP), ethylene-propylene-diene rubber (PP-EPDM), expanded polypropylene (EPP), glass fiber reinforced plastic (GFK), acrylonitrile-butadiene-styrene (ABS), polyamide (PA), PA 6, polybutylene terephthalate (PBT) or polyvinyl chloride (PVC). It was completely surprising that the addition of the binder according to the invention enables the production of a plastic which in and of itself has an enhanced binding and/or adhesion capacity, especially preferably an enhanced binding and/or adhesion capacity for lacquers preferably selected from the of group base lacquers, one-coat lacquers, colored lacquers and protective lacquers, wherein these may be transparent or non-transparent. The plastics produced in this way thus advantageously exhibit the adhesion-promoting properties of the binder according to the invention themselves. Application of the binder or the base coat to prepare the plastic for a coat of lacquer is advantageously not necessary. Instead of this, a plastic with adhesion and binding capacity of this type can be coated directly with various lacquers or paints. This additionally facilitates the lacquering process or other color application processes by saving money on time and material.

The use of adhesion-promoting plastics is especially suitable for plastic parts in structures in which the plastic parts are difficult to reach. This means, among other things, plastic components in motor vehicle design, in aircraft, ships or buildings. Instead of laborious pretreatment with a conventional method or pretreatment with a base coat, the plastic parts can be quickly and lacquered without laborious pretreatment. Surprisingly, multiple coats of lacquer can be applied advantageously to the adhesion-promoting plastic without laborious after treatment.

In addition it is also possible also to coat other materials, in particular metals, with the adhesion-promoting plastic. As a result of coating with the adhesion-promoting plastic, the materials have the advantages according to the invention. In particular the materials coated with the enhanced-adhesion plastics, such as metals, can be directly lacquered or imprinted without requiring laborious pretreatment of the materials. In addition, the adhesion-promoting plastic can also be provided with pigments or dyes, so that it can serve directly as a lacquer substitute for coating materials such as metals.

In the following, additional preferred possible applications of the binder according to the inventions or of the base coat according to the invention will be named. In intended uses, coating of a plastic using the binder according to the invention preferably also includes by definition the coating of a plastic using the base coat according to the invention. After coating the plastic with the binder according to the invention or the base coat according to the invention, preferably lacquer coating make take place, or as described above, the lacquer may already be added to the base coat, as described above. To simplify the language here, such coatings of plastics in the sense of the invention are designated as plastic coating according to the invention. In addition, coating of a plastic using the binder according to the invention, called plastic coating for short, can also initially be understood as the production of a plastic using the binder according to the invention, which in later process steps can be coated with lacquer. The surprisingly observed advantageous properties of the binder according to the invention in particular are responsible for the advantageous properties of the plastic coating according to the invention.

The invention preferably relates to coating of plastic surfaces of vehicle parts, in particular of automobile parts. The plastic coating according to the invention is, as described above, especially simple for auto parts and can be performed without great expense compared with conventional methods. In addition, the plastic coating according to the invention provides for long-lasting quality, which in particular can meet the high requirements for coats of lacquer in the vehicle sector. Thus, plastic coating according to the invention is especially weather resistant and abrasion resistant. Plastic parts in the automotive sector, especially in the area of vehicle exteriors, are subject to high wear rates even with average use. The wear takes place, among other things, due to weathering, e.g., rain, wind or hail when the car parked as well as while being driven. Dust, insects or, for example, pebbles that impact the plastic coating during driving especially contribute to wear. It was surprising, that the plastic coating according to the invention effectively decreases these wear phenomena because of its high physical durability. It was also completely surprising that the plastic coating according to the invention provides protection against weathering due to UV radiation. In the case of conventional plastic coatings, intense solar radiation exposure in particular causes wrinkling of the surface and bleaching of the color. Surprisingly, these effects can be greatly reduced by the plastic coating according to the invention. The protection from strong solar radiation can be further enhanced by the addition of UV protectants to the plastic coating according to the invention.

The invention also preferably relates to coating of plastic window surfaces using the binder according to the invention. In this process it was surprising that the plastic coating according to the invention is especially resistant to weathering. Thus the surface of the plastic coating according to the invention advantageously undergoes little or no roughening, even when exposed to strong rain or wind loads or solar radiation. Particularly surprisingly the plastic coating according to the invention is also very durable, even against the action of hard materials. For example the plastic coating according to the invention of windows can provide protection from extreme weather situations, such as during a hailstorm or vandalism.

The invention also preferably relates to exterior and/or interior coating of plastic surfaces von piping, preferably the interior of piping, using the binder according to the inventions. It was surprising that a plastic coating according to the invention is especially suitable for coating of pipes, in particular water pipes, wastewater pipes, but also pipes for the transporting of oil. Surprisingly, by plastic coating according to the invention of various pipes, it was possible to enhance the abrasion resistance of the pipes. Even in the case of strongly hydroabrasive fluids containing undissolved solids, for example in wastewater from construction sites, the pipes could be protected effectively from abrasion by the plastic coating according to the invention. Particularly surprisingly, the transport of fluids in pipes can be increased by the plastic coating according to the invention. This is especially advantageous, for example, in the case of coating of oil pipelines with the plastic according to the invention. Surprisingly, in the case of oil pipelines with a plastic coating according to the invention, the energy required for transport of the oil is reduced due to reduction of the frictional resistance on the insides of the pipes. In addition, the plastic coating according to the invention is especially resistant to oil and other organic materials. In particular it was completely surprising that microorganisms such as bacteria or algae exhibit less adhesion on the plastic coating according to the invention. This effect leads to an additional protection function of the pipes coated with plastic according to the invention.

The invention furthermore preferably relates to coating of plastic surfaces on everyday plastic articles using the binder according to the invention, e.g., PET bottles, plastic cups or trading cards, which are supposed to be marked easily and quickly. Due to the adhesion-promoting properties of the plastic coating according to the invention, especially simple and durable marking of various everyday plastics with conventional markers is possible. Surprisingly, the binder according to the invention der plastic coating according to the invention provides the plastic coating according to the invention not only adhesion capacity toward lacquers in particular, but also toward conventional markers and pens.

The invention further advantageously relates to coating of plastic surfaces using the binder according to the invention for bonding the plastic. Surprisingly in this way the plastic coating not only imparts stronger adhesion of lacquers, but also of conventional adhesives or other plastics. The plastic coating makes possible especially stable and durable bonding of plastic parts.

The invention further preferably relates to coating of plastic surfaces of aircraft using the binder according to the invention. In particular this means all plastic surfaces, both in the interior of the aircraft and in the exterior region. Surprisingly the plastic coating is especially abrasion resistant, even at high flying speeds and very severe weather conditions. In addition, the plastic coating according to the invention is highly resistant to high UV irradiation at high altitudes. The protection of the plastic coating according to the invention from intense solar irradiation can be further enhanced by addition of UV protectants. Thus with the plastic coating according to the invention, plastic parts of aircraft less often require replacement due to abrasive wear. In addition, because of its weathering resistance, the plastic coating according to the invention surprisingly has especially positive effects on the appearance, which scarcely changes even due to heavy stress. Particularly surprisingly, weight can be saved with a plastic coating according to the invention compared with conventional methods. Coating of plastics in aircraft according to the invention thus reduces the total weight of the aircraft and leads to lower fuel consumption and operating costs.

Furthermore the invention preferably relates to coating of plastic surfaces on ships. Surprisingly the plastic coating according to the invention exhibits especially high durability even in salt water. Plastic parts coated according to the invention on the exterior of the ship thus undergo abrasive wear much more slowly than conventionally coated plastics. In addition, the plastic coating according to the invention maintains a positive appearance far longer compared with conventional plastic coatings without wrinkling or spalling of additionally applied lacquer layers. Absolutely surprisingly the plastic coating according to the invention also leads to improved flow behavior, so that fuel savings are achieved in the propulsion of the ship compared with conventional coatings. Furthermore it was quite unexpectedly found that microorganisms, e.g., algae, do not adhere to the plastic coating according to the invention, so that the plastic is additionally preserved from abrasive wear by this biological effect.

In addition the invention preferably relates to a coating for plastic surfaces that are exposed to strong solar irradiation. Examples of such plastic surfaces are plastic surfaces on the exterior of motor vehicles, plastic chairs for outdoor use, sunglasses, plastic casings for solar systems etc. Very surprisingly a plastic coating according to the invention produces strong protection against UV rays. With conventional plastic coatings, UV irradiation leads to increased wrinkling, abrasive wear and reduced color quality. These disadvantageous are lastingly avoided by means of the plastic coating according to the invention. In addition, the protection from strong solar irradiation by the plastic coating according to the invention can be additionally enhanced by the addition of UV protectants.

In the following, the invention will be explained further based on examples, without being limited to these.

It is noted that various alternatives to the embodiments of the invention described can be used to carry out the invention and achieve the solution according to the invention. The materials and methods according to the invention in its embodiments are thus not limited to the preferred embodiments above. Instead, a large number of variants to the embodiments is conceivable, which may differ from the solution presented. The goal of the claims is to define the scope of protection of the invention. The scope of protection of the claims is directed toward covering the materials and methods according to the invention and equivalent embodiments thereof.

The following production examples describe preferred embodiments for producing a binder, a base coat and various lacquers. In addition, in the production examples, preferred methods for coating plastics are described, and along with them methods are described with which the quality of the coating can be tested. In the production examples, the parts by weight of the components are reported using the short form "parts" in some instances.

EXAMPLE 1

Preparation of a Binder

The following reagents are used for the preparation of a first intermediate product for the binder:
(1) 1500 parts by weight Hardlen® 14 LWP (chlorinated polypropylene, molecular weight 60,000, chlorine content 27%, with a specific gravity ($H_2O$=1) of 1.2)
(2) 8470 parts by weight xylene (organic solvent, molecular weight 106.17 g/mol, general formula $C_8H_{10}$)
(3) 30 parts by weight CoatOSil® 1770 (modified silane mixture, epoxysilane with a molecular weight 288.46 g/mol)

In a first step reagent (1), the chlorinated polyolefin mixture Hardlen® 14 LWP, is mixed in stepwise to reagent (2), the organic solvent xylene, under continuous stirring with a dissolver, wherein the dissolver disk has a diameter of 250 mm and a stirring speed of 550 revolutions per minute.

In a second step the temperature of the reaction mixture is increased to 80° C. and maintained there for two hours. After the system containing reagents (1) and (2) is well mixed, reagent (3), the modified silane mixture CoatOSil® 1770, is added to the reaction mixture and stirred for 10 min. This constitutes the first intermediate product for the binder.

For further processing the first intermediate product to make the binder, the following reagents are used:
(4) 2300 parts by weight of the first intermediate product
(5) 5200 parts by weight xylene (organic solvent, molecular weight 106.17 g/mol, general formula $C_8H_{10}$)
(6) 2500 parts by weight Laroflex® MP 35 (vinyl chloride ($C_2H_3Cl$)-isobutyl vinyl ether($C_6H_{12}O$) copolymer, chlorine content 44%)

The reagent (6), the vinyl chloride-isobutyl vinyl ether copolymer Laroflex® MP 35, is mixed stepwise into reagent (5), the organic solvent xylene. This takes place under continuous stirring with a dissolver, wherein the dissolver disk has a diameter of 250 mm and the stirring speed is 550 revolutions per minute. This is now the second intermediate product for the binder.

Then reagent (4), i.e., 2300 parts by weight of the first intermediate product, is introduced into the second intermediate product, containing reagents (5) and (6), and homogenized by stirring.

The binder obtained is uniform, and in this case the nonvolatile components amount to 29 wt.-%.

EXAMPLE 2

Preparation of a Binder

The following reagents are used for preparing a first intermediate product for the binder:
(1) 1800 parts by weight Hardlen® 14 LWP (chlorinated polypropylene, molecular weight 60,000, chlorine content 27%, with a specific gravity ($H_2O=1$) of 1.2)
(2) 8050 parts by weight xylene (organic solvent, molecular weight 106.17 g/mol, general formula $C_8H_{10}$)
(3) 150 parts by weight CoatOSil® 1770 (modified silane mixture, epoxysilane with a molecular weight 288.46 g/mol)

In a first step reagent (1), the chlorinated polyolefin mixture Hardlen® 14 LWP, is mixed in stepwise to reagent (2), the organic solvent xylene, under continuous stirring with a dissolver, wherein the dissolver disk has a diameter of 250 mm and the stirring speed is 550 revolutions per minute.

In a second step the temperature of the reaction mixture is increased to 80° C. and maintained there for two hours. After the system containing reagents (1) and (2) is well mixed, reagent (3), the modified silane mixture CoatOSil® 1770, is added to the reaction mixture and stirred for 10 min. This is the first intermediate product for the binder.

For further processing the first intermediate product to the binder, the following reagents are used:
(4) 2400 parts by weight of the first intermediate product
(5) 4700 parts by weight xylene (organic solvent, molecular weight 106.17 g/mol, general formula $C_8H_{10}$)
(6) 2900 parts by weight Laroflex® MP 35 (vinyl chloride ($C_2H_3Cl$)-isobutyl vinyl ether($C_6H_{12}O$)-mixture, chlorine content 44%)

Reagent (6), the vinyl chloride-isobutyl vinyl ether copolymer Laroflex® MP 35, is mixed in stepwise to reagent (5), the organic solvent xylene. This is done under continuous stirring with a dissolver, wherein the dissolver disk has a diameter of 250 mm and the stirring speed is 550 revolutions per minute. This is the second intermediate product for the binder.

Then reagent (4), i.e., 2400 parts by weight of the first intermediate product, is introduced to the second intermediate product, containing reagents (5) and (6), and homogenized by stirring.

The products obtained are uniform and their external appearance is excellent; in this case the nonvolatile components amount to 34 wt.-%.

EXAMPLE 3

Preparation of a Binder:

The following reagents are used for preparation of a first intermediate product for the binder:
(1) 2000 parts by weight Hardlen® CY-9124P (chlorinated polypropylene, molecular weight 60,000, chlorine content 22% and specific gravity (H2O=1) 1.6)
(2) 7900 parts by weight ethylbenzene (organic solvent, molecular weight 106.17 g/mol, general formula $C_8H_{10}$)
(3) 100 parts by weight heptasilane (modified silane mixture, molecular weight 212.72 g/mol, general formula $Si_7H_{16}$, isomer number 9)

In a first step reagent (1), the chlorinated polyolefin mixture Hardlen® CY-9124P, is mixed in stepwise to reagent (2), the organic solvent ethylbenzene, under continuous stirring with a dissolver, wherein the dissolver disk has a diameter of 250 mm and the stirring speed is 550 revolutions per minute.

In a second step the temperature of the reaction mixture is increased to 80° C. and maintained for two hours. After the system containing reagents (1) and (2) is well mixed, reagent (3), the modified silane mixture heptasilane, is added to the reaction mixture and stirred for 10 min. This is the first intermediate product for the binder.

For further processing the first intermediate product to form the binder, the following reagents are used:
(4) 2500 parts by weight of the first intermediate product
(5) 4500 parts by weight toluene (organic solvent, molecular weight 92.14 g/mol, general formula $C_7H_8$)
(5) 3000 parts by weight HERRMANN MP45 (vinyl chloride ($C_2H_3Cl$)-isobutyl vinyl ether($C_6H_{12}O$) copolymer, chlorine content 22%)

Reagent (6), the vinyl chloride-isobutyl vinyl ether copolymer HERRMANN MP45, is mixed in stepwise to reagent (5), the organic solvent toluene. This is done under continuous stirring with a dissolver, wherein the dissolver disk has a diameter of 250 mm and the stirring speed is 550 revolutions per minute. This represents the second intermediate product for the binder.

Then reagent (4), i.e., 2500 parts by weight of the first intermediate product, is introduced to the second intermediate product, containing reagents (5) and (6), and homogenized by stirring.

EXAMPLE 4

Preparation of a Binder:

The following reagents are used for preparation of the binder:
(1) 3.75 parts by weight Hardlen® 13LB (chlorinated polypropylene with a chlorine content of 25% and a mean molecular weight of 110,000 at a solids content of 30 wt.-%, toluene solution)
(2) 21.175 parts by weight n-butyl acetate (general formula C6H12O2) 35-60 parts by weight (organic solvent, molecular weight 116.16 g/mol, general formula $C_6H_{12}O_2$)
(3) 0.075 parts by weight CoatOSil® MP 200 (modified silane mixture, epoxy (mequiv./g) 4.785)
(4) 25 parts by weight Hostaflex VCM 6230(vinyl chloride ($C_2H_3Cl$)-isobutyl vinyl ether($C_6H_{12}O$ copolymer)
(5) 50 parts by weight xylene (organic solvent, molecular weight 106.17 g/mol, general formula $C_8H_{10}$ In a first step reagent (1), the chlorinated polyolefin mixture Hardlen® 13LB, is introduced stepwise to reagent (2), the organic solvent n-butyl acetate, under continuous stirring with a dissolver, wherein the dissolver disk has a diameter of 250 mm and the stirring speed is 550 revolutions per minute.

In a second step the temperature of the reaction mixture is increased to 65° C. and maintained for two hours. After the system consisting of reagents (1) and (2) is well mixed, reagent (3), the modified silane mixture CoatOSil® MP 200, is added to the reaction mixture and stirred for 10 min. This step is likewise performed at a temperature of 65° C. Then the reaction mixture is cooled to room temperature (approx. 20-25° C.).

In a third step first reagent (4), the vinyl chloride-isobutyl vinyl ether copolymer Hostaflex VCM 6230, is added to the reaction mixture under continuous stirring. Then reagent (5), the organic solvent xylene, is added to the reaction mixture while stirring continuously. Preferably the mixing in of the components with the aid of a dissolver takes place over a period of, wherein the dissolver disk has a diameter of 250 mm and the stirring speed is 500 revolutions per minute. In this way the reaction mixture is homogenized and the binder is finished.

EXAMPLE 5

Method for Preparation of a Pigmented Glossy Light Yellow One-Coat Lacquer for Direct Application to Plastic With the binder which can be produced according to the invention, for example a binder corresponding to examples 1-4, high-gloss air-drying one-coat lacquers directly applicable to plastic parts can be produced.

Optimal pigment dispersion is obtained by using closed, water-cooled bead mills. Products manufactured by WAB, DRAIS or similar companies can be used for this purpose.

Physical Data:
Friction element size: 0.8-1.5 mm
Material: Zirconium oxide
Lacquer pressure: 0.2-2 bar
Temperature: 30-60° C.
Batch size: 100-2000 kg (or more depending on size of mill)

In the preparation, first a highly pigmented abrasive compound is ground in the bead mill with a portion of the binder according to the invention until an adequate particle size (<12 μm) is achieved. Then lacquering is performed with the remaining part of the lacquer to achieve optimal gloss. The shear forces inside the bead mill are very high and impose stress on the binder. The binder fraction that is added next is no longer stressed by the grinding process and guarantees excellent gloss.

Example of a production run:

| Item 1. | 60-80 | parts by weight of the binder according to the invention |
| Item 2. | 0.1-0.5 | parts by weight pigment wetting additive |
| Item 3. | 2-5 | parts by weight titanium dioxide (not an anatase type) |
| Item 4. | 2-4 | parts by weight iron oxide yellow |

Item 1 is taken as the starting material, then Items 2-4 are added while stirring with a dissolver.

The dissolver disk should have a diameter of 220 mm to 350 mm and the stirring speed should be 300-700 revolutions per minute; 500 revolutions per minute are preferred.

After addition of all components, the pigment paste is ground at least three times in der bead mill to achieve the required pigment particle size of <12 μm. After the first grinding process, the paste is immediately pumped through the bead mill a 2nd time.

Then the paste is further processed as follows:

| Item 5 | 15-30 | parts by weight binder for lacquer make-up |
| Item 6 | 0.2-1 | parts by weight plasticizer (phthalate-free) |
| Item 7 | 0.5-1 | parts by weight leveling agent |

Items 5 to 7 are added to the paste immediately after the grinding process while it is still warm. The addition takes place while stirring continuously. After a final stirring time of 10 minutes the one-coat lacquer is ready for use.

Lacquer Data:
Viscosity: 60-120 sec F4/20° C.
Solids content: 40-60%
Drying time: 10-15 min insensitive to dust, 30 min grip test
Gloss level: 80-85% according to LANGE 60°
Hardness: min. 87 according to Buchholz (after drying for 5 days)
Elasticity: 1-2 mm mandrel bending test (after drying for 5 days)

The one-coat lacquer can be applied by painting; the following dilution is needed for application with spray guns:

| 60-80 | parts by weight lacquer concentrate |
| 20-40 | parts by weight special diluent |

The optimal viscosity for dip application can also be set with the special diluent. In this way it is also possible to adapt the concentrate for filling into aerosols wherein the suitable blowing agent must be selected.

The special solvent mixture has the following composition:

| 20-60 | wt.-% xylene |
| 10-40 | wt.-% n-butyl acetate |
| 10-40 | wt.-% ethyl acetate |
| 10-30 | wt.-% acetone |

Using this solvent combination, one-coat lacquers based on the binder which can be produced according to the invention can be optimally adapted to the intended use, wherein the mixing ratios of the components may vary.

Explanations on the Production Method:

| Item 1 | Binder according to the invention (e.g., a binder according to examples 1-4) |
| Item 2 | Pigment wetting additive: the binder is compatible with a large number of commercially available additives. Additives of the Additol brand (available from ALLNEX Germany GmbH) or Byk products (available from BYK/ALTANA) are preferred. |
| Item 3 | All conventional types of titanium dioxide can be used. Rutile types are preferred. Anatase types have a strong tendency toward chalking and loss of gloss. Products of the series KRONOS (available from BAYER AG) or FINNTITAN (available from the BRENNTAG group) can preferably be used. |
| Item 4 | Here also all conventional iron oxide pigments may be used |
| Item 5 | Binder according to the invention |
| Item 6 | Commercially available, phthalate-free plasticizers such as Jayflex MB 10 (available from ALBIS PLASTIC KFT). |
| Item 7 | Surface leveling additives of the Additol brand or Byk give the best results. |

It is known to the person skilled in the art that additional methods and chemical products are possible for further processing the binder into a one-coat lacquer. The special and novel characteristic of adhesion of the one-coat lacquer on plastics without requiring pretreatment results exclusively from the binder according to the invention. The adhesion capacity is not due to the above-listed additional components for producing the one-coat lacquers.

EXAMPLE 6

Method for Preparation of a Silk Luster Metallic Silver Lacquer for Direct Application to Plastic:

With the binder according to the invention it is possible to produce silk luster air-drying metallic lacquers that can be applied directly on plastic parts.

For optimal pigment dispersion, a dissolver is used wherein the dissolver disk should have a diameter of 220 mm to 350 mm. The stirring speed is preferably 300-700 revolutions per minute; 500 revolutions per minute are especially preferred. The best results are achieved with a toothed disk design.

In the preparation, first a highly pigmented and high-viscosity paste is stirred together with one part of the binder until a sufficiently homogeneous mixture is obtained. Then a lacquer is produced with the remainder of the binder to achieve an optimal gloss level.

The shear forces produced within the paste by stirring with the toothed disk are high and put stress on the binder. The subsequently added binder fraction is no longer so highly stressed due to the decreasing viscosity and guarantees excellent gloss.

Example of a production:

| Item 1. | 10-60 | parts by weight binder |
| Item 2. | 0.1-0.5 | parts by weight pigment wetting additive |
| Item 3. | 10-20 | parts by weight metallic pigment |
| Item 4. | 1-4 | parts by weight antideposition agent |

Item 1 is taken initially and items 2-4 are added while stirring with a dissolver. Heating the paste to 40° C. by homogenization is preferred.

Then the paste is further processed as follows:

| Item 5 | 10-20 | parts by weight binder added to form the lacquer |
| Item 6 | 0.5-2 | parts by weight molecular sieve |
| Item 7 | 1-10 | parts by weight n-butyl acetate |

Items 5 to 7 are added to the paste immediately after the grinding process while it is still hot. The addition is performed under constant stirring. After a final stirring time of 10 minutes the metallic lacquer is finished.

Lacquer Data:
Viscosity: 50-110 sec F4/20° C.
Solids content: 35-50%
Drying time: 10-15 min insensitive to dust, 30 min grip test
Gloss level: 30-65% according to LANGE 60°
Hardness: min. 87 according to Buchholz (after drying for 5 days)
Elasticity: 1-2 mm mandrel bending test (after drying for 5 days)

The metallic lacquer can be applied by painting; for application using spray guns, dilution with
60-80 parts by weight lacquer concentrate
20-40 parts by weight special diluent is preferred.

Using the special diluent, the optimal viscosity for dip application can also be set. With this, the concentrate for filling into aerosols can also be set, wherein the suitable blowing agent must be selected.

The special solvent mixture has the following composition:

| 20-60 | wt.-% xylene |
| 10-40 | wt.-% n-butyl acetate |
| 10-40 | wt.-% ethyl acetate |
| 10-30 | wt.-% acetone |

Using this solvent combination, metallic lacquers produced based on the binder according to the invention can be optimally adapted to the intended application; the mixing ratios of the components may vary.

Explanations on the Production Method:

| Item 1 | Binder that can be produced according to the invention |
| Item 2 | Pigment wetting additive; the binder is with compatible with a large number of commercially available additives. Additives of the Additol brand (available from ALLNEX GERMANY GmbH) or Byk products (available from BYK/Altana) are preferred. |
| Item 3 | A large number of conventional aluminum pastes can be used. Products from the METALUX series of the Eckart company result in very attractive coatings. |
| Item 4 | Additive for facilitating the stirring up of the sediment; this comprises large-volume, high-density molecules. The products commercially available under the name of AEROSIL (available from DEGUSSA) are ideal. |
| Item 5 | Binder which can be produced according to the invention |
| Item 6 | This is a molecular sieve for optimally aligning the metal pigments in the lacquer layer. Best results are achieved with products available from the firm of GRACE DAVISON GmbH under the name of SYLOSIV A 4.) |
| Item 7 | Solvent for establishing the final viscosity |

It is known to the person skilled in the art that additional methods and chemical products are possible for processing the binder into a metallic lacquer. The special and novel characteristic of adhesion of the metallic lacquers to plastics without requiring pretreatment results exclusively from the binder according to the invention. The adhesion capacity is not caused by the above-listed additional components for producing the metallic lacquer.

EXAMPLE 7

Method for Preparation of a High-Gloss Clear Lacquer for Direct Application to Plastic Using the binder which can be produced according to the invention it is possible to prepare high-gloss air-drying clear lacquers that can be applied directly to plastic parts and stabilize the plastics against exposure to solar radiation through the UV filters that they contain.

For optimal dispersion a dissolver is used, the dissolver disk of which should have a diameter of 220 mm to 350 mm. The stirring speed preferably amounts to 300-700 revolutions per minute; 500 revolutions per minute are especially preferred. The best results are achieved with a toothed disk design.

In the preparation, first a high-viscosity paste is stirred with one part of the binder until a sufficiently homogeneous mixture is obtained. Then the lacquer is built up using the remaining binder fraction to achieve an optimal gloss level. The shear forces produced within the paste by stirring with the toothed disk are high and stress the binder. The subsequently added binder fraction is no longer so highly stressed because of the decreasing viscosity and guarantees an excellent luster.

Example of a production:

| Item 1. | 15-75 | parts by weight binder |
| Item 2. | 0.1-0.5 | parts by weight pigment wetting additive |
| Item 3. | 0.2-2 | parts by weight special UV filter |
| Item 4. | 0.2-2 | parts by weight plasticizer |

Item 1 is taken initially, Items 2-4 are added while under stirring with a dissolver. Heating the paste to 40° C. by homogenization is preferred.

Then the paste is further processed as follows:

| Item 5 | 15-30 | parts by weight binder for lacquer making |
|---|---|---|
| Item 6 | 0.5-1 | parts by weight leveling agent |
| Item 7 | 1-10 | parts by weight n-butyl acetate |

Items 5 to 6 are added to the paste immediately after the grinding process while it is still in the warm state. The addition is performed while stirring constantly. After a final stirring time of 10 minutes the clear lacquer is finished.

Lacquer Data:
Viscosity: 40-100 sec F4/20° C.
Solids content: 20-50%
Drying time: 10-15 min insensitive to dust, 30 min grip test
Gloss level: 80-90% according to LANGE 60°
Hardness: min. 87 according to Buchholz (after drying for 5 days)
Elasticity: 1-2 mm mandrel bending test (after drying for 5 days)

The clear lacquer can be applied by painting; for application using spray guns a dilution of
60-80 parts by weight lacquer concentrate
20-40 parts by weight special diluent is preferred.

The optimal viscosity for dip application can also be adjusted using the special diluent. In this way the concentrate can also be adjusted for filling into aerosols, wherein a suitable blowing agent must be selected.

The special solvent mixture has the following composition:

| 20-60 | wt.-% xylene |
|---|---|
| 10-40 | wt.-% n-butyl acetate |
| 10-40 | wt.-% ethyl acetate |
| 10-30 | wt.-% acetone |

Using this solvent combination, clear lacquers based on the binder according to the invention can be adjusted optimally for the intended application, wherein the mixing ratios of the components may vary.

Explanations on the Production Method:

| Item 1 | Binder produced according to the invention |
|---|---|
| Item 2 | Pigment wetting additive: the binder is compatible with a large number of the commercially available additives. Additives of the Additol brand (available from ALLNEX Germany GmbH) or Byk products (available from Byk/Altana) give the best results. |
| Item 3 | A very good UV protection effect is obtained with products of the THINUVIN series from BASF |
| Item 4 | Commercially available, phthalate-free plasticizers such as Jayflex MB 10 (available from ALBIS PLASTIC KFT) are required to keep the lacquer layers elastic even after prolonged, continuous exposure to sunlight. |
| Item 5 | Binder according to the invention |
| Item 6 | Surface-leveling additives of the Additol brand (available from ALLNEX Germany GmbH) or Byk give the best results. |
| Item 7 | Solvent for adjusting the final viscosity |

It is known to the person skilled in the art that additional methods and chemical products are possible to further process the binder to make a clear lacquer. The special and novel characteristic of adhesion of the clear lacquer to plastics without requiring pretreatment results exclusively from the binder according to the invention. The adhesion capacity is not due to the above-listed additional components for producing the clear lacquer.

EXAMPLE 8

Method for Preparation of a Special Adhesive for the Bonding of Paperboard Packaging to Plastics Very hard-to-solve bonding problems often occur in industry. These include the bonding of different substrates which, depending on the application method, may also be considered as lamination. HOT MELT adhesives or water-based dispersions are usually used for this purpose. With the binder which can be produced according to the invention, it is possible to prepare adhesives that are suitable for applications for which the systems available to date do not achieve adequate adhesion.

This specifically relates to the bonding of paperboard packaging or paper to plastic surfaces.

In the preparation of the adhesives, first a high-viscosity paste is stirred with one part of the binder until a sufficiently homogeneous mixture is obtained. Then the remaining binder fraction is mixed in to achieve an optimally stable consistency. The shear forces produced within the paste by stirring with the toothed disk are high and stress the binder. As a result of the decreasing viscosity, the subsequently added binder fraction is no longer so greatly stressed and guarantees excellent adhesive strength.

Example of a production:

| Item 1. | 40-70 | parts by weight binder |
|---|---|---|
| Item 2. | 0.1-0.5 | parts by weight defoamer |
| Item 3. | 0.1-0.5 | parts by weight boric acid |
| Item 4. | 0.1-0.5 | parts by weight substrate wetting additive |

Item 1 is taken initially, and items 2-4 are added while stirring with a dissolver.

The dissolver disk should preferably have a diameter of 220 mm to 350 mm. The stirring speed is preferably 300-700 revolutions per minute; 500 revolutions per minute are especially preferred. The best results are achieved with of a toothed disk design.

After addition of all components, the high-viscosity paste is dispersed for at least 20 min. Then the paste is further processed as follows:

| Item 5 | 10-20 | parts by weight binder for lacquer make-up |
|---|---|---|
| Item 6 | 10-30 | parts by weight n-butyl acetate |

Items 5 to 6 are added to the paste after the 20-minute stirring phase. The addition is performed during constant stirring. After a final stirring time of 10 minutes the adhesive is finished.

Adhesive Data:
Viscosity: 2000+/−500 mpas 4/20/23 Brookfield
Solids content: 30-60%
Setting time: 1-3 minutes depending on the substrate The adhesive can be applied by spraying; for adjusting to the system and the nozzle sizes a dilution of

| 50-80 | wt. adhesive |
|---|---|
| 20-50 | parts by weight special diluent | is necessary.

For major customers, an adhesive mixture according finally adjusted to the system parameters can be produced specifically for the customer. In this way, adjustment precisely tailored for the customer's system conditions is possible.

The special diluent has the following composition:

| | |
|---|---|
| 20-60 | wt.-% xylene |
| 10-40 | wt.-% n-butyl acetate |
| 10-40 | wt.-% ethyl acetate |
| 10-30 | wt.-% acetone |

Using the special diluent the optimal viscosity for fully automated adhesive application can also be set. Likewise the drying speed can be varied by varying the diluent composition.

Explanations on the Production Method:

| | |
|---|---|
| Item 1 | Binder that can be produced according to the invention |
| Item 2 | Defoamer for preventing air inclusions. Additives of the Additol brand (available from ALLNEX Germany GmbH) or Byk products (available from BYK/Altana) give the best results. |
| Item 3 | Commercially available boric acid (technical grade) is not dissolved in this waterless adhesive but is dispersed extremely finely by the dissolver and is important for the penetration of the adhesive into the cellulose fibers |
| Item 4 | Substrate wetting additive for better wetting of the plastic surface. Additives of the Additol brand (available from ALLNEX Germany GmbH) or Byk products (available from BYK/Altana) give the best results. |
| Item 5 | Binder according to the invention |
| Item 6 | Solvent for adjusting the viscosity |

It is known to the person skilled in the art that additional methods and chemical products are possible for further processing the binder into an adhesive. The special and novel possibility for bonding paperboard packaging with the adhesive without requiring pretreatment results exclusively from the binder according to the invention. The adhesion capacity is not due to the above-listed additional components for producing the adhesive.

EXAMPLE 9

Preparation of a Base Coat
1. In a reactor equipped with a reflux condenser, heating, cooling and metering devices, 8470 parts xylene are placed. Over 5 hours, 1500 parts of a chlorinated polyolefin mixture, especially a Hardlen® type, more specifically a Hardlen® 14 LWP or a Hardlen® DX-530P are dissolved at a room temperature of approx. 20° C., i.e., no thermal heat addition to the solution is needed. After dissolution is complete, the mixture is brought to a core temperature of 80° C. within 2 hours and held there for 1 hour. Then the mixture is stirred while warm, and while this is taking place, 30 parts of a modified silane mixture, especially CoatOSil® 1770, are stirred in over 15 minutes. The result is the first intermediate product for the binder.
2. To produce the second intermediate product for the binder, in a new batch in a reactor equipped with a reflux condenser, heating, cooling and metering devices, 3500 parts vinyl chloride-isobutyl vinyl ether copolymer are introduced into a mixture of 3000 parts xylene and 3500 parts butyl acetate, which is fully dissolved with continuous stirring for 1 hour.
3. To produce the binder, 2300 parts of the first intermediate product are mixed by stirring with 7700 parts of the second intermediate product. After forcing through a filter, a viscosity von 0.98 g/cm³ results. The filtrate can be forced through a 60 μm or 80 μm sized mesh to ensure that no foreign particles remain in the binder obtained in this way.
4. The transparent coating can be processed into a top coat or a base coat for plastics.
5. 5100 parts of the binder of step 3 are mixed with 400 parts bentonite and 50 parts black paste in a continuously running dissolver.
6. Then 2500 parts titanium dioxide and 1000 parts Calpex 1 are added with the dissolver running continuously and ground to a particle size of less than 15 μm.
7. After reaching the desired particle size, 100 parts Epikote™ 828 are stirred in and homogenized
8. The base coat obtained in step 7 is adjusted with a solvent mixture of 35% butyl acetate and 65% xylene to a density of 1.30 g/cm³.

For testing, the base coat is allowed to stand for 24 hours to ensure setting.

EXAMPLE 10

Preparation of a Base Coat
1. In a reactor equipped with reflux condenser, heating, cooling and metering devices, 7100 parts butyl acetate and 1380 parts xylene are placed. Over 2 hours, 1500 parts of a chlorinated polyolefin mixture, especially a Hardlen® type, more specifically a Hardlen® 14 LWP or a Hardlen® DX-530P are dissolved at a temperature of approx. 70° C., i.e., thermal heat is added during the dissolution. After dissolution is complete, the mixture is brought to a core temperature of 70° C. within 2 hours and maintained for 30 minutes. The mixture is now stirred while hot and then over 15 minutes, 20 parts of a modified silane mixture, especially CoatOSil® 1770, are stirred in. In this way the first intermediate product is finished, and then further processed to form a binder.
2. To finish the second intermediate product, in a new batch 4000 parts vinyl chloride-isobutyl vinyl ether copolymer are added to a mixture of 3000 parts xylene and 3000 parts butyl acetate mixture in a reactor equipped with reflux condenser, heating, cooling and metering devices, then dissolved completely during 1 hour with constant stirring.
3. The two intermediate products can be processed into a top coat or a base coat for plastics.
4. 2000 parts of the second intermediate product are mixed with 300 parts bentonite, 100 parts black paste, 100 parts Aerosil, 2300 parts Calpex and 1000 parts Bayferrox in a continuously running dissolver and ground to a particle size of less than 15 μm.
5. The base coat is made into a lacquer with 1000 parts of the first intermediate product and 2000 parts of the mixture of step 4. Then 35 parts Epikote™ and 80 parts BYK 355 are added.
6. The base coat is stirred up cleanly and adjusted to a density of 1.26 g/cm³ with xylene.

For testing, allow the base coat to stand for 24 hours to ensure setting.

EXAMPLE 11

Preparation of a Base Coat
1. In a reactor equipped with reflux condenser, heating, cooling and metering devices are placed 8760 parts xylene. Over 5 hours 1200 parts of a chlorinated polyolefin mixture, especially a Hardlen® type, more specifically a Hardlen® 14 LWP or a Hardlen® DX-530P are dissolved at a room temperature of approx. 20° C., i.e., no thermal heat need be applied during the dissolution. After dissolution is complete, the mixture is brought within 2 hours to a core temperature of 80° C. and held for 1 hour. The mixture is now stirred up while hot and then over 15 minutes, 40 parts of a modified silane mixture, especially CoatO-Sil® 1770, are stirred in. In this way the first intermediate product for the binder is finished.

2. To produce the second intermediate product for the binder, in a new batch, following addition to a reactor provided with a reflux condenser, heating, cooling and metering devices, 4500 parts vinyl chloride-isobutyl vinyl ether copolymer are added to a mixture of 3000 parts xylene and 2500 parts butyl acetate, then completely dissolved in 1 hour under continuous stirring. This is the second intermediate product for the binder.

3. The two intermediate products can be mixed to form a binder and then processed into a top coat or a base coat for plastics.

4. 2000 parts of the second intermediate product are mixed with 300 parts bentonite, 80 parts Aerosil®, 2000 parts Calpex and 1300 parts titanium dioxide in a continuously running dissolver and dispersed to a particle size of less than 20 μm.

5. Then 1700 parts of the second intermediate product, 1400 parts of the first intermediate product and 30 parts Epicote™ as well as 80 parts BYK 355 are added and homogenized.

6. The base coat obtained in step 5 is adjusted with a solvent mixture of 35% butyl acetate and 65% xylene to a density of 1.30 g/cm$^3$.

The base coat is allowed to stand for 24 hours before testing, to ensure setting.

EXAMPLE 12

Preparation of a Base Coat:

1. In a reactor equipped with reflux condenser, heating, cooling and metering devices, 8980 parts xylene are placed. Over 2 hours, 1000 parts of a chlorinated polyolefin mixture, especially a Hardlen® type, more specifically a Hardlen® 14 LWP or a Hardlen® 15LP are dissolved at a temperature of approx. 70° C., i.e., the aromatic hydrocarbon taken initially is preheated to 70° C. After dissolution is complete, the mixture is brought to a core temperature of 80° C. within 1 hour and held for 1 hour. The mixture is now stirred up while hot and then over 15 minutes, 20 parts of a modified silane mixture, especially CoatOSil® 1770, are stirred in. In this way the first intermediate product for the binder is finished.

2. The first intermediate product is then cooled overnight to room temperature, approx. 22° C. A product temperature of 22° C. is optimal for further processing the first intermediate product into a binder.

3. 2000 parts xylene are placed in a reactor equipped with reflux condenser, heating, cooling and metering devices, a 40% volume of vinyl chloride-isobutyl vinyl ether copolymer are added and mixed, the two components are stirred until clean and smooth; with constant stirring, then 300 parts bentonite, 120 parts Aerosil®, 2000 parts Calpex and 1300 titanium dioxide are incorporated and dispersed to a particle size of less than 15 μm. This is the second intermediate product.

4. For making up the base coat into a lacquer, 2000 parts of the first intermediate product and 1200 parts of the second intermediate product (xylene-vinyl chloride-isobutyl vinyl ether copolymer) and 30 parts Epikote™ are mixed using a continuously running dissolver.

5. Then a viscosity of 1.26 g/cm$^3$ is set with xylene.

EXAMPLE 13

Preparation of a Base Coat:

1. In a reactor equipped with reflux condenser, heating, cooling and metering devices, 6000 parts butyl acetate and 1920 parts xylene are placed. Over 5 hours, 2000 parts of a chlorinated polyolefin mixture, especially a Hardlen® type, more specifically a Hardlen® 14 LWP or a Hardlen® 15LP at a room temperature of approx. 20° C. are dissolved, i.e., it is not necessary to add thermal heat during dissolution. After dissolution is complete, the mixture is brought within 2 hours to a core temperature of 65° C. and maintained for 1 hour. The mixture is now stirred up in the cold state and at the same time, over 15 minutes, 80 parts of a modified silane mixture, especially CoatOSil® 1770, are stirred in. In this way the first intermediate product for the binder is finished.

2. To finish the second intermediate product for the binder, in a new batch with introduction into a reactor equipped with a reflux condenser, heating, cooling and metering devices, 3600 parts vinyl chloride-isobutyl vinyl ether copolymer are introduced into a mixture of 3900 parts xylene and 2500 parts butyl acetate, which is completely dissolved 1 hour with continuous stirring.

3. For preparation of the binder, 3000 parts of the first intermediate product and 7000 parts of the second intermediate product are mixed while stirring. After forcing out through a filter, a viscosity of 0.98 g/cm$^3$ results. The filtrate can be forced through a 60 μm or 80 μm sized mesh to ensure that no foreign particles remain in the binder obtained in this way.

4. The transparent coating can be processed into a top coat or a base coat for plastics.

5. 4800 parts of the binder of step 3 are mixed with 400 parts bentonite and 50 parts black paste with the dissolver running.

6. Then 3000 parts titanium dioxide are added with the dissolver running continuously and ground to a particle size of less than 15 μm.

7. The base coat obtained in step 6 is adjusted with a solvent mixture of 35% butyl acetate and 65% xylene to a density of 1.30 g/cm$^3$.

8. For testing, the base coat is allowed to stand for 24 hours to ensure setting.

EXAMPLE 14

Preparation of a Base Coat

1. In a reactor equipped with reflux condenser, heating, cooling and metering devices, 8490 parts xylene are placed. Over 2 hours, 1500 parts of a chlorinated polyolefin mixture, especially a Hardlen® type, more specifically a Hardlen® 14 LWP or a Hardlen® 15LP are dissolved at a temperature of approx. 70° C., i.e., the aromatic hydrocarbon in the container is preheated to 70° C. After dissolution is complete, the mixture is brought within 1 hour to a core temperature of 80° C. and held for 1 hour. The mixture is now stirred up while warm and then 10 parts of a modified silane mixture, especially CoatOSil® 1770, are stirred in for 15 minutes. This is the first intermediate product for the binder.

2. To finish the second intermediate product for the binder, in a new batch with introduction into a reactor equipped with a reflux condenser, heating, cooling and metering devices, 3200 parts vinyl chloride-isobutyl vinyl ether copolymer are completely dissolved in 6800 parts xylene for 1 hour while stirring continuously.
3. The two intermediate products, i.e., the first intermediate product with 1800 parts and the second intermediate product with 8200 parts, are mixed while stirring. After forcing through a filter, a viscosity of 0.98 g/cm$^3$ results. The filtrate can be forced through a 60 µm or 80 µm sized mesh to ensure that no foreign particles remain in the binder thus obtained.
4. The transparent coating can be processed into a top coat or a base coat for plastics.
5. 4900 parts binder are mixed with 400 parts bentonite and 150 parts black paste in a continuously running dissolver.
6. Then 4000 parts titanium dioxide are introduced to the continuously running dissolver and ground to a particle size of less than 15 µm.
7. The base coat obtained in step 6 is adjusted to a density of 1.30 g/cm$^3$ with a solvent mixture of 35% butyl acetate and 65% xylene.
8. For testing, the base coat is allowed to stand for 24 hours to ensure setting.

EXAMPLE 15

Preparation of a Base Coat

1. In a reactor equipped with a reflux condenser, heating, cooling and metering devices, 8760 parts xylene are placed. 1200 parts of a chlorinated polyolefin mixture, especially a Hardlen® type, more specifically a Hardlen® 14 LWP or a Hardlen® 15LP are dissolved for 2 hours at a temperature of approx. 70° C., i.e., the initially taken aromatic hydrocarbon is preheated at a temperature of 70° C. After dissolution is complete, the mixture is brought to a core temperature of 80° C. within 1 hour and held for 1 hour. The mixture is now stirred up in the warm condition and then for 15 minutes 40 parts of a modified silane mixture, especially CoatOSil® 1770, is stirred in. After this the first intermediate product for the binder is finished.
2. The first intermediate product is then cooled overnight to room temperature, approx. 22° C. For further processing the first intermediate product into the binder, a product temperature of 22° C. is optimal.
3. In a reactor equipped with reflux condenser, heating, cooling and metering devices, 2500 parts of the finished first intermediate product is placed and mixed with 4800 parts xylene, the two components are stirred until cleanly smooth, and then under continuous stirring 2300 parts vinyl chloride-isobutyl vinyl ether copolymer are incorporated and completely dissolved for 1 hour under continuous stirring. As a visual check for complete dissolution, the binder is a clear mixture with a slight yellow tinge.
4. The binder is then filtered and allowed to rest; the binder can now also be further processed into a top coat. After forcing through a filter, a viscosity of 0.98 g/cm$^3$ results. The filtrate can be forced through a mesh 60 µm or 80 µm in size to ensure that no foreign particles remain in the binder thus obtained.
5. The transparent coating can be processed into a top coat or a base coat for plastics.
6. 3800 parts of the binder are mixed with 400 parts bentonite and 100 parts black paste in a continuously running dissolver.
7. Then 2600 parts titanium dioxide and 1000 parts Calpex are added to the continuously running dissolver and ground to a particle size of less than 15 µm.
8. The base coat obtained in step 7 is adjusted with 1100 parts of a solvent mixture of 50% butyl acetate and 50% xylene to a density of 1.30 g/cm$^3$.
9. For testing, the base coat is allowed to stand for 24 hours to ensure setting.

EXAMPLE 16

Preparation of a Base Coat

1. In a reactor equipped with reflux condenser, heating, cooling and metering devices, 8570 parts xylene are placed. Over 5 hours, 1400 parts of a chlorinated polyolefin mixture, especially a Hardlen® type, more specifically a Hardlen® 14 LWP or a Hardlen® 15LP, are dissolved at a room temperature of approx. 20° C., i.e., it is not necessary to add thermal heating during dissolution. After dissolution is complete, the mixture is brought within 2 hours to a core temperature of 85° C. and maintained for 1 hour. The mixture is now stirred while warm and then over 15 minutes, 30 parts of a modified silane mixture, especially CoatOSil® 1770, are stirred in. In this way the first intermediate product for the binder is finished.
2. The first intermediate product is then cooled overnight to room temperature, approx. 22° C. For further processing the first intermediate product to a binder, a product temperature of 22° C. is optimal.
3. In a reactor equipped with reflux condenser, heating, cooling and metering devices, 2300 parts of the finished first intermediate product are placed with 5000 parts of a xylene/butyl acetate mixture and mixed, wherein the mixing ratio of the xylene/butyl acetate mixture is 60:40 (xylene:butyl acetate). The two constituents are stirred clean and smooth. Then while stirring constantly, 2500 parts vinyl chloride-isobutyl vinyl ether copolymer are incorporated; these are completely dissolved within 2 hours under continuous stirring.
4. The binder is then filtered and allowed to stand. Now the binder can be further processed directly to a top coat. After forcing through a filter, a viscosity of 0.98 g/cm$^3$ results. The filtrate can then be forced through a 60 µm or 80 µm sized mesh, ensuring that no foreign particles remain in the binder obtained in this way.
5. The transparent coating can be processed into a top coat or a base coat for plastics.
6. 2000 parts of the binder are mixed with 400 parts bentonite and 50 parts black paste in a continuously running dissolver.
7. Then 2500 parts titanium dioxide are added with the dissolver running continuously and ground to a particle size of less than 15 µm.
8. The top coat is adjusted to a density of 1.30 g/cm$^3$ with 1500 parts butyl acetate and 1000 parts xylene.
9. For testing, the base coat is allowed to stand for 24 hours to ensure setting.

EXAMPLE 17

Preparation of a Base Coat
1. In a reactor equipped with reflux condenser, heating, cooling and metering devices, 7100 parts butyl acetate and 1380 parts xylene are placed. Over 5 hours, 1500 parts of a chlorinated polyolefin mixture, especially a Hardlen® type, more specifically a Hardlen® 14 LWP or a Hardlen® 15LP are dissolved at a room temperature of approx. 20° C., i.e., it is not necessary to add thermal heat during dissolution. After dissolution is complete, the mixture is brought within 6 hours to a core temperature of 85° C. and held for 1 hour. The mixture is now agitated while warm and then 20 parts of a modified silane mixture, especially CoatOSil® 1770, is stirred in for 15 minutes. In this way the first intermediate product for the binder is finished.
2. The first intermediate product is then cooled overnight to room temperature, approx. 22° C. For further processing the first intermediate product into a binder, a product temperature of 22° C. is optimal.
3. In a reactor equipped with reflux condenser, heating, cooling and metering devices, 2500 parts of the finished first intermediate product with 5000 parts xylene are placed and mixed. The two constituents are stirred until clean and smooth. Then while stirring constantly 2500 parts vinyl chloride-isobutyl vinyl ether copolymer are incorporated; this is completely dissolved within 1 hour under constant stirring. As a visual check for complete dissolution, the binder is a clear mixture with a slight yellow tinge.
4. The binder is then filtered and allowed to stand. After forcing through a filter, a viscosity of 0.98 g/cm$^3$ results. The filtrate can be forced through a mesh of 60 μm or 80 μm in size, ensuring that no foreign particles remain in the binder obtained in this way.
5. The transparent coating can be processed into a top coat or a base coat for plastics.
6. 5000 parts of the binder are mixed with 250 parts bentonite and 80 parts black paste in a continuously running dissolver.
7. Then 3000 parts Calpex1 are placed in a continuously running dissolver and ground to a particle size of less than 15 μm.
8. The base coat obtained in step 7 is adjusted to a density of 1.30 g/cm$^3$ with a solvent mixture of 35% butyl acetate and 65% xylene.
9. For testing, the base coat is allowed to stand for 24 hours to ensure setting.

EXAMPLE 18

Coating of Plastic with a Binder or a Base Coat
1. The plastic surfaces to be undercoated are cleaned with a suitable plastic cleaner.
2. The plastic surface is freed from contaminants, greases and dust and aired off for at least 3 min.
3. The binder or the base coat is mixed with a diluent which is a mixture of butyl acetate and xylene to a workable viscosity. The viscosity of the binder or the base coat is approx. 160 seconds in a 4 mm DIN cup (the viscosity is measured with a 4 mm DIN cup). To set an optimally workable viscosity for the paint guns or a lacquering robot, the binder or the base coat is diluted such that it has a viscosity of approx. 15 seconds in the DIN 4 mm cup. For an initial viscosity of the binder or the base coat of 135 seconds in the DIN 4 mm cup, a base coat:diluent dilution of 2:1 by volume leads to viscosities of 16 to 25 s in the DIN 4 mm cup at a temperature of 20° C. The binder is also preferably diluted in a binder:dilution volume ratio of 2:1.
4. For the processing of the binder or the base coat made on the basis thereof, an air pressure operated paint gun or a lacquering robot is used. In order for the corresponding coating layer to be processed, a lacquering pressure with the corresponding paint gun nozzle is set. In the case of robot lacquering the corresponding device will be adapted to the product. The pressure and nozzle settings can vary in the case of different devices. In the case of a compressed air-driven paint gun, a nozzle size of 1.2-1.3 mm (HVLP 1.3-1.4 mm) and a spraying pressure of 2-4 bar (HVLP 0.8-1.2 bar) are preferably used.
5. The dry layer thickness is set at 20-40 μm. In the case of textured surfaces, a minimum layer thickness of 20 μm above the roughness depth is set. The dry layer thickness is set such that adhesion to the respective plastic substrate can be achieved. In the case of a top coat the dry layer thickness is at least 20 μm. The layer thickness is measured with a conventional layer thickness meter or with the aid of an electronic knife, as is usual in laboratories.
6. The spreading rate of the base coat is 17 m$^2$/kg/20 μm. In the case of a base coat delivery viscosity of 135 seconds in a 4 mm DIN cup and mixing with the diluent to achieve the workable viscosity of 15 seconds in a 4 mm DIN cup, a workable area can be calculated. With 1 kg base coat and 0.5 liter of diluent, approx. 17 m$^2$ plastic substrate can be coated by lacquering with a paint gun.
7. After 15 minutes of ventilating at 20° C. the base coat can be overcoated with water- or with solvent-containing pigmented lacquer layers, in particular 1-component or 2-component top coats.

EXAMPLE 19

Method for Testing the Adhesion of the Plastic Coating with Using the Cross-Cut Test Standard
1. After manufacturing, the binder or the base coat is allowed to stand for 24 hours; during this time the cross-linking of the raw materials in the binder is assured. Unchanged quality is determined by a viscosity measurement.
2. The binder or the base coat is mixed to a workable viscosity.
3. A polypropylene plastic substrate is cleaned with a commercially available plastic cleaner.
4. Using a compressed air-driven paint gun, the binder or the base coat is coated as described in Example 17.
5. The plastic disk is labeled with data on the processing and the date and dried at room temperature of approx. 20° C. without thermal heat exposure for 24 hours.
6. The effect and adhesion can also be improved or accelerated by thermal heat exposure, in other words, the plastic substrate can be thermally dried at 60° C. and 40 minutes or at 80° C. and 30 minutes.
7. After 24 hours, cross-cutting is performed with an ISO cross-cut tester for plastic substrates (DIN EN ISO 2409).
8. This is followed by an adhesive tape tear-off according to DIN EN ISO 2409
9. With the binder of Examples 1-4 and the base coat of Examples 9-17, the cut edges are completely smooth, i.e., no square is pulled off, and the adhesion test is thus successful. One-coat lacquers such as clear lacquers produced with the binder according to the invention also have very high adhesive properties according to the indicated test standard.

COMPARISON EXAMPLE 20

Preparation of a Comparison Binder

To perform comparison experiments a comparison binder is produced, wherein compared with binders according to the invention, the addition of a vinyl chloride-vinyl ether copolymer such as Laroflex MP 35 is omitted.

For preparing a comparison binder, the following reagents are used:
(1) 1500 parts by weight Hardlen® 14 LWP (chlorinated polypropylene, molecular weight 60,000, chlorine content 27%, with a specific gravity ($H_2O=1$) of 1.2)
(2) 8470 parts by weight xylene (organic solvent, molecular weight 106.17 g/mol, general formula $C_8H_{10}$)
(3) 30 parts by weight CoatOSil® 1770 (modified silane mixture, epoxysilane with a molecular weight 288.46 g/mol)

In a first step reagent (1), the chlorinated polyolefin mixture Hardlen® 14 LWP, is mixed stepwise into reagent (2), the organic solvent xylene, under continuous stirring with a dissolver, wherein the dissolver disk has a diameter of 250 mm and the stirring speed is 550 revolutions per minute.

In a second step the temperature of the reaction mixture is raised to 80° C. and maintained for more than two hours. After the system containing reagents (1) and (2) is well mixed, reagent (3), the modified silane mixture CoatOSil® 1770, is added to the reaction mixture and stirred for 10 min. In this way the comparison binder is finished. This corresponds to the first intermediate product of a binder according to the invention.

COMPARISON EXAMPLE 21

Preparation of a Comparison Binder

To perform comparison experiments, a comparison binder is produced, wherein compared with the binder according to the invention the addition of a modified silane mixture, for example an epoxysilane CoatOSil® 1770, is omitted.

To prepare a first intermediate product for the comparison binder, the following reagents are used:
(1) 1500 parts by weight Hardlen® 14 LWP (chlorinated polypropylene, molecular weight 60,000, chlorine content 27%, with a specific gravity ($H_2O=1$) of 1.2)
(2) 8500 parts by weight xylene (organic solvent, molecular weight 106.17 g/mol, general formula $C_8H_{10}$)

In a first step reagent (1), the chlorinated polyolefin mixture Hardlen® 14 LWP, is mixed in stepwise to reagent (2), the organic solvent xylene, under continuous stirring with a dissolver, wherein the dissolver disk has a diameter of 250 mm and a stirring speed of 550 revolutions per minute.

In a second step the temperature of the reaction mixture is increased to 80° C. and maintained for two hours. This is the first intermediate product for the binder.

For further processing the first intermediate product to the comparison binder, the following reagents are used:
(3) 2300 parts by weight of the first intermediate product
(4) 5200 parts by weight xylene (organic solvent, molecular weight 106.17 g/mol, general formula $C_8H_{10}$)
(5) 2500 parts by weight Laroflex® MP 35 (vinyl chloride ($C_2H_3Cl$)-isobutyl vinyl ether($C_6H_{12}O$) copolymer, chlorine content 44%)

Reagent (5), the vinyl chloride-isobutyl vinyl ether copolymer Laroflex® MP 35, is mixed in stepwise to reagent (4), the organic solvent xylene. This takes place during continuous stirring with a dissolver, wherein the dissolver disk has a diameter of 250 mm and the stirring speed is 550 revolutions per minute. This is the second intermediate product for the binder.

Then reagent (3), i.e., 2300 parts by weight the first intermediate product, is introduced to the second intermediate product, containing reagents (4) and (5), and homogenized by stirring.

COMPARISON EXAMPLE 22

Preparation of a Comparison Binder

To perform comparison experiments, a comparison binder is produced, wherein in contrast to the binder according to the invention, no heating of the reaction mixture to a temperature between 65° C. and 120° C. for producing the first intermediate product takes place. Instead of this, the reaction mixture is only heated to a temperature of 40° C.

The following reagents are used to prepare a first intermediate product for the binder:
(1) 1500 parts by weight Hardlen® 14 LWP (chlorinated polypropylene, molecular weight 60,000, chlorine content 27%, with a specific gravity ($H_2O=1$) von 1.2)
(2) 8470 parts by weight xylene (organic solvent, molecular weight 106.17 g/mol, general formula $C_8H_{10}$
(3) 30 parts by weight CoatOSil® 1770 (modified silane mixture, epoxysilane with a molecular weight 288.46 g/mol)

In a first step reagent (1), the chlorinated polyolefin mixture Hardlen® 14 LWP, is mixed in stepwise to reagent (2), the organic solvent xylene, under continuous stirring with a dissolver, wherein the dissolver disk has a diameter of 250 mm and a stirring speed of 550 revolutions per minute.

In a second step the temperature of the reaction mixture is increased to 40° C. and maintained for two hours. After the system containing reagents (1) and (2) is well mixed, reagent (3), the modified silane mixture CoatOSil® 1770, is added to the reaction mixture and stirred for 10 min. This is the first intermediate product for the binder.

For further processing the first intermediate product to the binder, the following reagents are used:
(4) 2300 parts by weight of the first intermediate product
(5) 5200 parts by weight xylene (organic solvent, molecular weight 106.17 g/mol, general formula $C_8H_{10}$)
(6) 2500 parts by weight Laroflex® MP 35 (vinyl chloride ($C_2H_3Cl$)-isobutyl vinyl ether($C_6H_{12}O$) copolymer, chlorine content 44%)

Reagent (6), the vinyl chloride-isobutyl vinyl ether copolymer Laroflex® MP 35, is mixed in stepwise to reagent (5), the organic solvent xylene. This takes place under continuous stirring with a dissolver, wherein the dissolver disk has a diameter of 250 mm and the stirring speed is 550 revolutions per minute. This is the second intermediate product for the binder.

Then reagent (4), i.e., 2300 parts by weight of the first intermediate product, is introduced to the second intermediate product, containing reagents (5) and (6), and homogenized by stirring.

COMPARISON EXAMPLE 23

Preparation of a Comparison Base Coat

A comparison base coat is produced for performing comparison experiments:
1. A comparison binder according to Comparison Example 20 is produced.
2. 5100 parts of the comparison binder are mixed with 400 parts bentonite and 50 parts black paste in a continuously running dissolver.
3. Then 2500 parts titanium dioxide and 1000 parts Calpex 1 are introduced to a continuously running dissolver and ground to a particle size of less than 15 µm.
4. After this particle size is reached, 100 parts Epikote™ 828 are stirred in and homogenized
5. The base coat obtained in step 4 is adjusted to a density of 1.30 g/cm$^3$ with a solvent mixture of 35% butyl acetate and 65% xylene.

The base coat is allowed to stand for 24 hours before testing to ensure setting.

COMPARISON EXAMPLE 24

Preparation of a Comparison Base Coat

A comparison base coat is produced for performing comparison experiments:
1. A comparison binder according to Comparison Example 21 is produced.
2. 5100 parts of the comparison binder are mixed with 400 parts bentonite and 50 parts black paste in a continuously running dissolver.
3. Then 2500 parts titanium dioxide and 1000 parts Calpex 1 are placed in a continuously running dissolver and ground to a particle size of less than 15 µm.
4. After reaching this particle size, 100 parts Epikote™ 828 are stirred in and homogenized
5. The base coat obtained in step 4 is adjusted with a solvent mixture of 35% butyl acetate and 65% xylene to a density of 1.30 g/cm$^3$.

The base coat is allowed to stand for 24 hours before testing, to ensure setting.

COMPARISON EXAMPLE 25

Preparation of a Comparison Base Coat

A comparison base coat is produced for performing comparison experiments:
1. A comparison binder according to Comparison Example 22 is produced.
2. 5100 parts of the comparison binder are mixed with 400 parts bentonite and 50 parts black paste in a continuously running dissolver.
3. Then 2500 parts titanium dioxide and 1000 parts Calpex 1 are introduced into a continuously running dissolver and ground to a particle size of less than 15 µm.
4. After reaching the particle size, 100 parts Epikote™ 828 are stirred in and homogenized 5. The base coat obtained in step 4 is adjusted with a solvent mixture of 35% butyl acetate and 65% xylene to a density of 1.30 g/cm$^3$.

The base coat is allowed to stand for 24 hours before testing, to ensure setting.

EXAMPLE 28

Performance of Comparison Experiments

Preparation of the Samples:

Polypropylene (PP) is used as the starting material for the test substrate. The polypropylene disks are not pretreated physically or chemically for coating with the different binders, base coats or lacquers. Test disks were only cleaned to remove dust and grease.

Coating of the polypropylene disks is done as presented in Example 18.

To determine the adhesion of the binder and base coats produced from it to plastic substrates, various test procedures were performed on samples and comparison samples coated according to the invention.

TABLE 1

| Sample No. | Coating |
|---|---|
| | Sample numbers: |
| A | PP disks coated with binder according to Example 1 |
| B | PP disks coated with binder according to Example 2 |
| C | PP disks coated with binder according to Example 3 |
| D | PP disks coated with binder according to Example 4 |
| E | PP disks coated with comparison binder according to Comparison Example 20 |
| F | PP disks coated with comparison binder according to Comparison Example 21 |
| G | PP disks coated with comparison binder according to Comparison Example 22 |
| H | PP disks coated with base coat according to Example 9 |
| I | PP disks coated with base coat according to Example 10 |
| J | PP disks coated with base coat according to Example 11 |
| K | PP disks coated with base coat according to Example 12 |
| L | PP disks coated with comparison base coat according to Comparison Example 23 |
| M | PP disks coated with comparison base coat according to Comparison Example 24 |
| N | PP disks coated with comparison base coat according to Comparison Example 25 |
| O | PP disks coated with metallic lacquer according to Example 6 |
| P | PP disks coated with a top coat for plastic substrates, ECKART Effect pigments (D5 metallic lacquer gold) |
| Q | PP disks coated with a clear lacquer according to Example 7 |
| R | PP disks coated with a clear lacquer of STANDOX (Standocryl 2K Express Premium clear lacquer) |

Test Method: Cross-Cutting According to DIN EN ISO 2409

Testing with a cross-cut according to DIN EN ISO 2409: 2013-06 was performed on the samples, as presented in Example 19. In this way the resistance of a coating to separation from the substrate can be determined if a grid extending through to the substrate is cut into the coating.

The results of the cross-cuts are evaluated on a scale of GT 0 to GT 5.

GT 0 corresponds to a result in which after pulling off a strip of adhesive tape (Tesa 4657) the cut edges remain completely smooth. In other words, none of the squares is peeled off, and the adhesion testing is correspondingly successful.

GT 5 corresponds to the result in which, after pulling off a strip of adhesive tape (Tesa 4657), the squares completely peel off. In this case the adhesion test has failed.

Steam Jet Testing According to PV 1503

Test method: Steam jet testing according to PV 1503 (method A) DIN 55662 2008.03

Testing instrument: LTA1 (Walter Gerätebau)

Nozzle: EG 2506

Flow volume: 11.3 l/min

Temperature: 70° C. (at the nozzle)

Angle of incidence: 45°

Nozzle-sample distance: 15 cm

Testing time: 20 sec (per cut)

The scale for evaluating the steam jet testing is based on Volkswagen TL 211.

KW 0 corresponds to a result in which after testing the cut edges (St. Andrew's cross) remain completely smooth. In other words, the cut surface is completely smooth and shows no damage to the score lines, and the adhesion testing is thus successful.

KW 5 corresponds to a result in which after testing the cut edges (St. Andrew's cross) exhibit complete stripping of the coating. In other words, the cut surfaces are damaged and the scoring and the adhesion testing is thus negative. The result is therefore also characterized as failed (abbreviation n.b.).

Test Method: Humidity-Constant Climate Test 240 h

Test method: Humidity-constant climate according to DIN EN ISO 6270-2 CH

Testing time: 240 h

Evaluation: Visual according to DIN EN ISO 4628-1

Degree of blistering according to DIN EN ISO 4628-2

Cross-cut according to DIN EN ISO 2409/Adhesive: Tesa 4657

Steam jet testing according to PV 1503 A

The results of the humidity-constant climate test are evaluated on a scale of 1 (S1) to 5 (S5). The evaluation is based on Volkswagen TL 211.

1 (S1) corresponds to a finding that no visually altered surface structure is visible and complete adhesion and no visible alterations such as blistering are seen on the coated substrate.

5 (S5) corresponds to a finding of a clearly visible change in the coating surface such as blistering or complete separation. In this case the humidity-constant climate test is not passed.

In the case of a coating that does not enable adhesion to the plastic and thus leads to complete separation of the coating, the finding is also labeled as failed (n.b.).

Test Method: Cross-Cut after Humidity-Constant Climate Test

In this test method cross-cut testing according to DIN EN ISO 2409:2013-06 is performed following a humidity-constant climate test according to DIN EN ISO 6270-2 CH.

Test Method: Steam Jet Testing after Humidity-Constant Climate Test

In this test method steam jet testing according to according to PV 1503 is performed following a humidity-constant climate test according to DIN EN ISO 6270-2 CH.

Results of the Der Test Methods

The results of the test methods for the various samples A-R are shown in Table 2.

TABLE 2

| Sample number | Cross-cut DIN EN ISO 2409 | Steam jet-testing PV 1503 | Humidity-climate test 240 h | Cross-cut test after humidity test | Steam jet-test after humidity test |
|---|---|---|---|---|---|
| A | GT 0 | KW 0 | 1 (S1) | GT 0 | KW 0 |
| B | GT 0 | KW 0 | 1 (S1) | GT 0 | KW 0 |
| C | GT 1 | KW 1 | 1 (S1) | GT 1 | KW 1 |
| D | GT 1 | KW 2 | 2 (S2) | GT 2 | KW 2 |
| E | GT 4 | KW 5 | 3 (S3) | GT 5 | n.b. |
| F | GT 4 | KW 3 | 2 (S3) | GT 4 | KW 3 |
| G | GT 3 | KW 4 | 3 (S3) | GT 4 | KW 4 |
| H | GT 0 | KW 0 | 1 (S2) | GT 0 | KW 0 |
| I | GT 0 | KW 1 | 2 (S2) | GT 2 | KW 2 |
| J | GT 0 | KW 0 | 1 (S2) | GT 1 | KW 1 |
| K | GT 1 | KW 1 | 2 (S2) | GT 2 | KW 3 |
| L | GT 4 | KW 5 | 3 (S3) | GT 5 | n.b. |
| M | GT 4 | KW 3 | 2 (S3) | GT 4 | KW 3 |
| N | GT 3 | KW 4 | 3 (S3) | GT 4 | KW 4 |
| O | GT 1 | KW 2 | 2 (S2) | GT 2 | KW 2 |
| P | GT 5 | KW 5 | n.b. | GT 5 | KW 5 |
| Q | GT 1 | KW 2 | 2 (S2) | GT 2 | KW 2 |
| R | GT 5 | KW 5 | n.b. | GT 5 | KW 5 |

The invention claimed is:

1. A method for producing a binder comprising the following steps:
1) Producing a first intermediate product by a method comprising the following steps:
   1a) Mixing and dissolving 5-45 wt.-% of a chlorinated polypropylene with a chlorine content of between 20-35% in 50-99 wt.-% of a first organic solvent
   1b) Heating the mixture from the previous step to a temperature between 65° C.-120° C. for at least 30 min
   1c) Introducing 0.05 5 wt.-% of a modified epoxysilane to the mixture from the previous step at a mixing temperature of 65° C.-120° C.,
   wherein the wt.-% in 1a)-1c) is based on the total weight of the first intermediate product and the total of the wt.-% is less than or equal to 100
2) Further processing the first intermediate product to the binder by a method comprising the following steps:
   2a) Mixing 5-40 wt.-% of a vinyl chloride-isobutyl vinyl ether copolymer in 50-90 wt.-% of a second organic solvent
   2b) Introducing 10-80 wt.-% the first intermediate product to the mixture from the previous step
   2c) Homogenizing the mixture from the previous step,
   wherein the wt.-% in 2a)-2c) is based on the total weight of the and the total of the wt.-% is less than or equal to 100.

2. A method for producing a base coat for coating plastics comprising
1) Producing a binder using the method according to claim 1
3a) Mixing 10-30 wt.-% of the binder produced in the previous step with 2-10 wt.-% of a bentonite mixture
3b) Adding 10-30 wt.-% of a pigment mixture to the mixture from the previous step
3c) Adding 0.1-5 wt.-% of an additive mixture to the mixture from the previous step
3d) Adding 10-50 wt.-% of a third organic solvent to the mixture from the previous step,
wherein the wt.-% is based on the total weight of the base coat and the total of the wt.-% is less than or equal to 100.

3. The method for producing a base coat according to claim 2, characterized in that the pigment mixture comprises chemical compounds selected from the group comprising black paste, titanium dioxide or a combination thereof.

4. The method for producing a base coat according to claim 2, characterized in that the additive mixture comprises chemical compounds selected from the group comprising bisphenol A-epichlorohydrin resins and/or fumed silica.

5. The method for producing a binder according to claim 1
   wherein the 10-20 wt.-% of the chlorinated polypropylene is mixed and dissolved in 80-90 wt.-% of the first solvent in step 1a) and in step 1c) 0.1-0.5 wt.-% of the modified epoxysilane is added to the mixture from step 1b).

6. The method for producing a binder according to claim 1,
   wherein the modified epoxysilane comprises β-(3,4 epoxycyclohexyl)ethyltriethoxysilane.

7. The method for producing a binder according to claim 1
   wherein in step 2a) 20-30 wt.-% of the vinyl chloride-isobutyl vinyl ether copolymer is mixed in 40-60 wt.-% of the second organic solvent and in step 2b) 10-30 wt.-% of the first intermediate product is introduced to the mixture of step 2a).

* * * * *